(12) United States Patent
Shelton et al.

(10) Patent No.: US 12,527,625 B2
(45) Date of Patent: Jan. 20, 2026

(54) CHARACTERIZING TISSUE USING FLUORESCENCE EMISSION

(71) Applicant: GYRUS ACMI, INC., Westborough, MA (US)

(72) Inventors: Kurt G. Shelton, Bedford, MA (US); Sergey A. Bukesov, Acton, MA (US)

(73) Assignee: Gyrus ACMI, Inc., Westborough, MA (US)

( * ) Notice: Subject to any disclaimer, the term of this patent is extended or adjusted under 35 U.S.C. 154(b) by 485 days.

(21) Appl. No.: 18/046,539

(22) Filed: Oct. 14, 2022

(65) Prior Publication Data
US 2023/0126066 A1 Apr. 27, 2023

Related U.S. Application Data

(60) Provisional application No. 63/270,805, filed on Oct. 22, 2021.

(51) Int. Cl.
*A61B 18/20* (2006.01)
*A61B 18/00* (2006.01)

(52) U.S. Cl.
CPC .... *A61B 18/20* (2013.01); *A61B 2018/00773* (2013.01); *A61B 2018/2065* (2013.01)

(58) Field of Classification Search
None
See application file for complete search history.

(56) References Cited

U.S. PATENT DOCUMENTS

| | | |
|---|---|---|
| 4,641,650 A | 2/1987 | Mok |
| 9,757,199 B2 | 9/2017 | Chia et al. |
| 10,219,863 B2 * | 3/2019 | Yu .................... A61B 18/20 |
| 10,617,470 B2 | 4/2020 | Xuan et al. |
| 10,639,498 B2 * | 5/2020 | Enwemeka ............ A61L 2/16 |
| 10,675,481 B1 | 6/2020 | Tankovich |
| 11,109,911 B2 | 9/2021 | Brown et al. |
| 2003/0109860 A1 | 6/2003 | Black |
| 2011/0270092 A1 * | 11/2011 | Kang .................... G01J 3/4406 600/476 |
| 2013/0123648 A1 | 5/2013 | Stampoulidis et al. |
| 2015/0230864 A1 | 8/2015 | Xuan et al. |
| 2015/0289937 A1 | 10/2015 | Chia et al. |

(Continued)

FOREIGN PATENT DOCUMENTS

| | | |
|---|---|---|
| DE | 102022126810 A1 | 4/2023 |
| JP | H01135368 A | 5/1989 |

(Continued)

OTHER PUBLICATIONS

Google English Translation of JP 2011167344 A (Year: 2011).*

(Continued)

*Primary Examiner* — Shirley X Jian
(74) *Attorney, Agent, or Firm* — Schwegman Lundberg & Woessner. P.A

(57) ABSTRACT

A method for determining a characteristic of material at a target is provided. A target is illuminated with a pulsed light source. A fluorescence signal from the target when the pulsed light source is an "off" state is then sensed. Based on analysis of the fluorescence signal, a characteristic of material at the target is identified. A device can then be controlled based on the identified characteristic of the material at the target.

13 Claims, 12 Drawing Sheets

(56) References Cited

U.S. PATENT DOCUMENTS

| | | | |
|---|---|---|---|
| 2016/0135892 A1* | 5/2016 | Yu | A61B 1/0638 606/11 |
| 2016/0361120 A1 | 12/2016 | Brinkmann et al. | |
| 2018/0280723 A1* | 10/2018 | Enwemeka | A61L 2/16 |
| 2018/0344405 A1 | 12/2018 | Brown et al. | |
| 2020/0158620 A1 | 5/2020 | Iizuka et al. | |
| 2020/0397351 A1 | 12/2020 | Miyata | |
| 2021/0038064 A1 | 2/2021 | Shelton et al. | |
| 2021/0045812 A1 | 2/2021 | Talbot et al. | |
| 2022/0218415 A1 | 7/2022 | Lamrini et al. | |
| 2022/0221334 A1 | 7/2022 | Bell et al. | |
| 2023/0131637 A1 | 4/2023 | Shelton et al. | |
| 2024/0189028 A1 | 6/2024 | Manstein et al. | |
| 2024/0261023 A1 | 8/2024 | Quesson | |

FOREIGN PATENT DOCUMENTS

| | | |
|---|---|---|
| JP | H05219938 | 8/1993 |
| JP | 2004008412 | 1/2004 |
| JP | 2011167344 | 9/2011 |
| JP | 2013094348 | 5/2013 |
| JP | 2015009031 | 1/2015 |
| JP | 2021001916 | 1/2021 |
| JP | 7674322 B2 | 4/2025 |
| WO | 2011036792 | 3/2011 |

OTHER PUBLICATIONS

Google English Translation of JPWO201136792 A1 (Year: 2011).*

"Japanese Application Serial No. 2022-169391, Final Notification of Reasons for Rejection mailed Aug. 5, 2024", W English Translation, 5 pgs.

"Japanese Application Serial No. 2022-169391, Notification of Reasons for Rejection mailed Dec. 9, 2024", W English Translation, 5 pgs.

"Japanese Application Serial No. 2022-169390, Examiners Decision of Final Refusal mailed Apr. 30, 2024", w/ English translation, 8 pgs.

"Japanese Application Serial No. 2022-169390, Notification of Reasons for Refusal mailed Nov. 13, 2023", w/ English Translation, 17 pgs.

"Japanese Application Serial No. 2022-169390, Response filed Feb. 13, 2024 to Notification of Reasons for Refusal mailed Nov. 13, 2023", W/English Claims, 10 pgs.

"Japanese Application Serial No. 2022-169391, Response filed Jun. 17, 2024 to Notification of Reasons for Rejection mailed Jan. 15, 2024", w/ current English claims, 11 pgs.

"Japanese Application Serial No. 2022-169391, Response filed Nov. 5, 2024 to Final Notification of Reasons for Rejection mailed Aug. 5, 2024", w english claims, 8 pgs.

"Japanese Application Serial No. 2022-169390, Response filed Sep. 2, 2024 to Examiners Decision of Final Refusal mailed Apr. 30, 2024", w current English claims, 16 pgs.

"U.S. Appl. No. 18/046,534, Non Final Office Action mailed Apr. 23, 2025", 18 pgs.

"Japanese Application Serial No. 2022-169391, Response filed Mar. 10, 2025 to Notification of Reasons for Rejection mailed Dec. 9, 2024", w current English claims, 8 pgs.

"Japanese Application Serial No. 2022-169391, Notification of Reasons for Rejection mailed Jan. 15, 2024", W English Translation, 9 pgs.

"U.S. Appl. No. 18/046,534, Notice of Allowance mailed Aug. 22, 2025", 8 pgs.

"U.S. Appl. No. 18/046,534, Response filed Jul. 22, 2025 to Non Final Office Action mailed Apr. 23, 2025", 11 pgs.

"Japanese Application Serial No. 2024-150787, Notification of Reasons for Refusal mailed Sep. 16, 2025", W English Translation, 11 pgs.

"Japanese Application Serial No. 2024-150787, Response filed Dec. 16, 2025 to Notification of Reasons for Refusal mailed Sep. 16, 2025", w current English claims, 12 pgs.

* cited by examiner

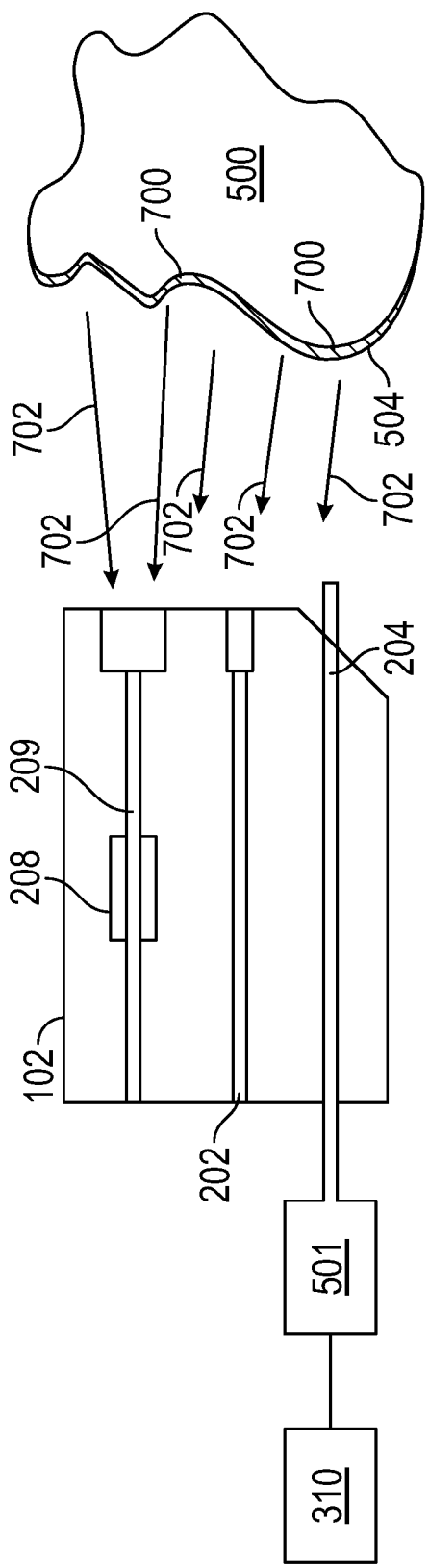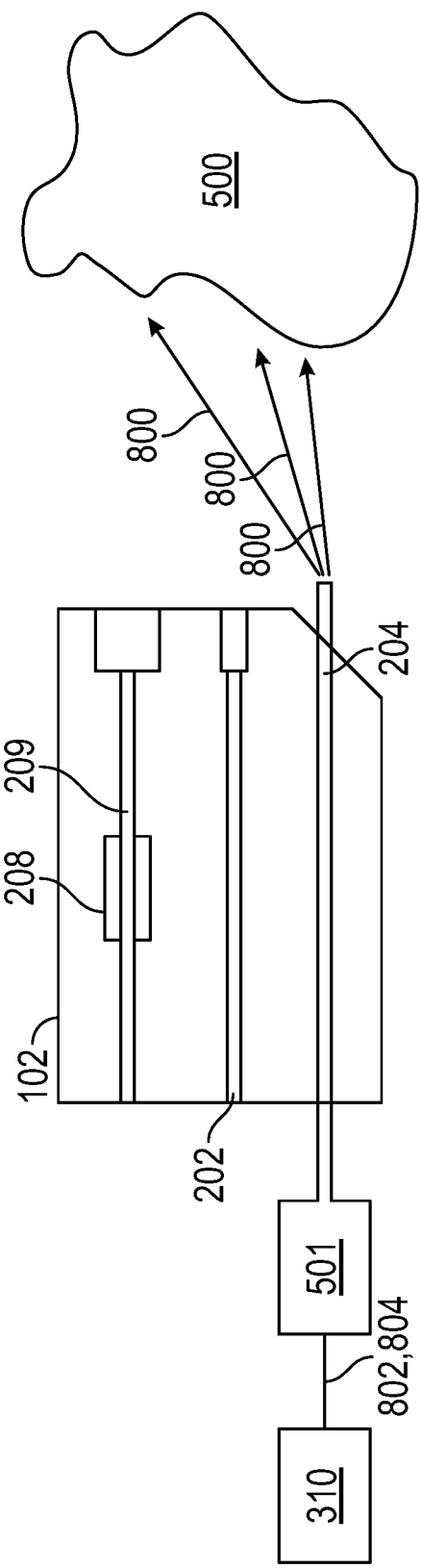

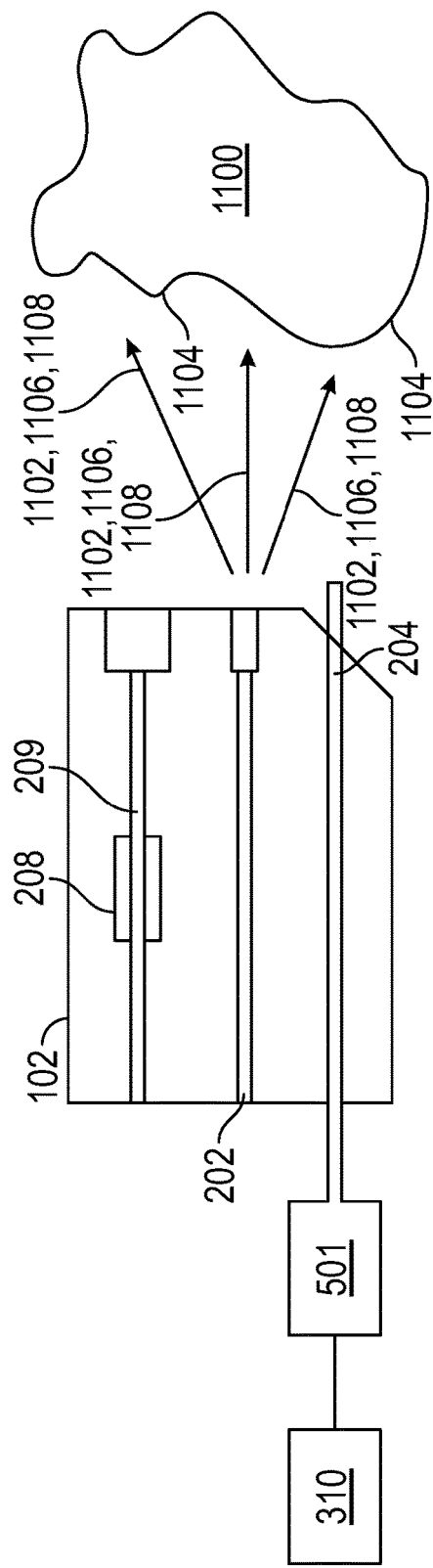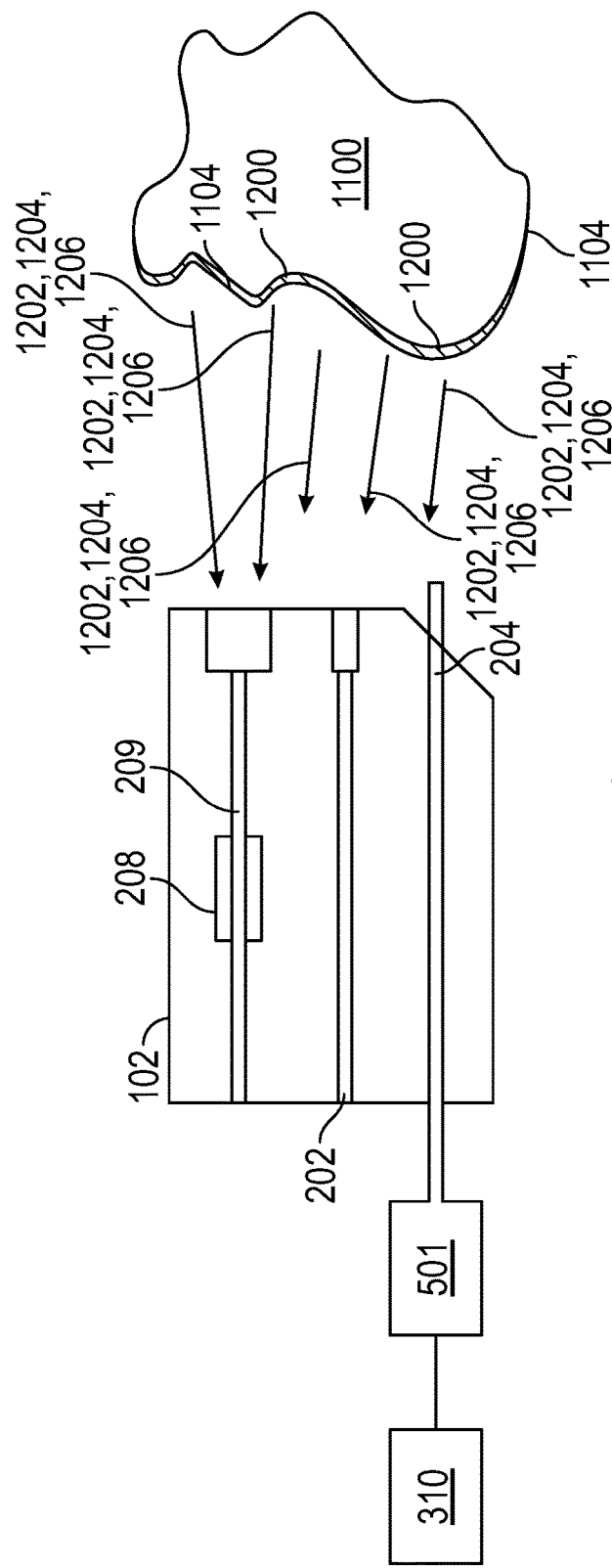

CHARACTERIZING TISSUE USING FLUORESCENCE EMISSION

PRIORITY CLAIM

This application claims the benefit of priority to U.S. Provisional Patent Application Ser. No. 63/270,805, filed Oct. 22, 2021, the contents of which are hereby incorporated by reference.

TECHNICAL FIELD

This document pertains generally to surgical devices and more specifically, but not by way of limitation, to a surgical device that can use fluorescence emissions to identify tissue or other target being removed.

BACKGROUND

Various surgical procedures can be used to remove material, such as hard or soft tissue from a patient. For example, surgical procedures can be used to ablate kidney stones during a lithotripsy procedure, remove cancerous tissue, form incisions in tissue, and vaporize tissue, such as during the treatment of Benign Prostatic Hyperplasia (BPH). However, a number of issues can arise with a device used to perform a surgical procedure.

For example, various parameters associated with the device may be modified during a surgical procedure. But a practitioner may not have the technical knowledge to ensure that each of these parameters are at their optimal setting, which can affect efficiency of tissue removal such as by increasing the time associated with the surgical procedure.

Where emissions from surgical device are used to remove cancerous tissue, ablate kidney stones, or treat BPH, if the parameters of the device are not properly set, the device may not operate as the practitioner intended. The emissions from the device may not correspond to what the practitioner desires. For example, when treating a cancerous site, tissue removal can occur faster than the practitioner anticipated. In this scenario, too much tissue might be removed. For example, when a device is being used to treat BPH, when tissue removal occurs faster than the practitioner anticipated, capsular perforation can occur.

Sometimes, the tissue being removed can change from one type, such as cancerous tissue or kidney stones, to another type, such as healthy tissue—without the practitioner being aware of the change. Misidentifying tissue can result in a wrong device setting, which can create the potential problems noted above, such as removing too much tissue or causing capsular perforation to occur.

SUMMARY

What is needed is an approach that can identify one or more characteristics of tissue or other target being removed, such as before or during a medical procedure.

This document describes examples of using a fluorescence response from a target site to determine a characteristic of a target site. The target site characteristic can include a target type, material, composition, a composition profile, a structure, a hardness, or the like. The target site can include, for example, tissue, a kidney stone, a pancreobiliary, a gallbladder stone or the like. The apparatus can determine the target characteristic using a spectra emitted from the target in response to illumination of the target site using a light source. The target site can be illuminated with the light source to energize a surface of the target site. In response, a fluorescence response signal can be obtained from the energized surface of the target site, such as when the light source is deactivated into an "off" state (i.e., being deactivated). A spectra of the fluorescence response signal can be used to determine a characteristic of the target.

For example, a light source of the apparatus can operate in an "on" state (i.e., being activated) and an "off" state (i.e., being deactivated). A photodetector can be used to detect a fluorescence response signal to the illumination when the light source is the "off" state. In this way, illumination light from the light source will not saturate and obscure the fluorescence response light signal from the target.

For example, the light source can include multiple LEDs. Different ones of the multiple LEDs can emit light at different wavelengths. A light source can include a first LED that emits light at a first wavelength, a second LED that emits a light a second wavelength, and a third LED that emits light at a third wavelength. The first LED can be in an "on" state while the second and third LEDs are in an "off" state. When the first LED is in the "on" state, a target site can be illuminated with light at the first wavelength. The first LED can then be switched to an "off" state and the second LED can be switched to an "on" state, such that the target site can be illuminated with light at the second wavelength. While the target site is being illuminated with the second LED, a first fluorescence response signal emitted from the target site in response to excitation by the first LED can be detected. Then, the second LED can be switched to an "off" state and the third LED can be switched to an "on" state to illuminate the target site with light at the third wavelength. While the target site is being illuminated with the third LED, a second fluorescence response signal emitted from the target site in response to excitation by the second LED can be detected. The third LED can then be switched to an "off" state, and a third fluorescence response signal emitted from the target site in response to excitation by the third LED can be detected. Using the first, second, and third fluorescence response signals from the target site, a fluorescence response spectra can be determined, from which a characteristic of the target site can be determined based on the spectra.

In operation, the characteristic of the target can optionally be determined in real time, that is, such that an apparatus being used to remove the target can be controlled in real time, such as based at least in part on the determined characteristic. For example, where a laser is being used to remove material from the target, one or more parameters of the laser (such as a pulse width of a laser pulse, a pulse shape of a laser pulse, a peak power of a laser pulse, or a pulse frequency representing a number of laser pulses per unit time) can be established or adjusted in real-time, such as based at least in part on the determined characteristic. Moreover, after removing material from the target site during a first time period, the fluorescence response can be used to determine whether a characteristic of the target site has changed. For example, the characteristic can be determined based on second spectra emitted from the material at the target site in response to the material being again illuminated using the light source. Based on the second determination, the apparatus can be controlled, such as in real time, by establishing or adjusting one or more device parameters based on the change in characteristic determined from the change in fluorescence response from the target.

Several potential advantages can become possible using the present techniques. For instance, fluorescence response signals corresponding to energy absorbed at a target site can be detected without illuminating light from a light source that illuminates the target site saturating and obscuring the fluorescence effects, such as by switching a light source between an "on" state and an "off" state.

Also, when using multiple LED or other illumination light sources, the fluorescence response to a first illumination light source can be determined after that first illumination light source has been turned off. Even if a second LED or other illumination light source is turned on during such detection of the first fluorescence response to the first illumination light source, there can still be an advantage in detecting the first fluorescence response, such as where the second illumination light source emits light at a second wavelength that is more distant from the first fluorescence response wavelength and, therefore, easier to filter out during fluorescence response signal detection or signal processing and less likely to saturate or otherwise obscuring or interfering with detecting the first fluorescence response signal. By using a light source having a plurality of LEDs where as one LED of the plurality of LEDs is illuminating a target site, a fluorescence response signal corresponding to energy absorbed at the target site from illumination from another LED of the plurality of LEDs can be detected.

Another potential advantage can include identifying a characteristic of a material of a target in real time, which, in turn, can permit adjusting one or more parameters of an apparatus being used to remove or otherwise treat material at the target site in real time based on the identified characteristic.

Another potential advantage can relate to more accurate material removal from a target site, thereby reducing or minimizing the possibility of over-removing or under-removing material from the target site by establishing or changing device settings to be more appropriate for the desired material removal at the target.

BRIEF DESCRIPTION OF FIGURES

FIG. 7 shows an example of emission and sensing of fluorescence response signals from a target site.

FIG. 8 is an example of removing tissue from a target site using a laser beam from a laser for which one or more parameters were established or adjusted, such as based on the method shown in FIG. 4.

FIG. 11 illustrates an example of illuminating a target site with pulsed light.

FIG. 12 shows an example of illumination and fluorescence response signal sensing from a target site.

DETAILED DESCRIPTION

A medical device can use a fluorescence response signal to determine a characteristic of a target site. The characteristic can include a target type, material, composition, a composition profile, a structure, a hardness, or the like. For example, the target site can include tissue, a kidney stone, a pancreobiliary, a gallbladder stone, or the like. The apparatus can determine the characteristic of the target based on a spectra of response light emitted from the target in response to illuminating the target with a light source to energize a surface of the target site. The target site can be periodically, recurrently, or randomly illuminated by a light source. The light source may have an "on" state (i.e., being activated and emitting illumination light) and an "off" state (i.e., being deactivated and not emitting illumination light). The fluorescence response signal corresponding to a pulse from a light source may be detected after that pulsed light source is put in the "off" state. Then, the apparatus can determine a spectra of the fluorescence response signal. Using the determined spectra, the apparatus can determine a characteristic (such as a type, material, composition, a composition profile, a structure, a hardness, etc.) of the target. The present techniques can be used with a laser, ultrasound, or other system for removing material from a target site or performing another desired medical procedure.

Figure 1:
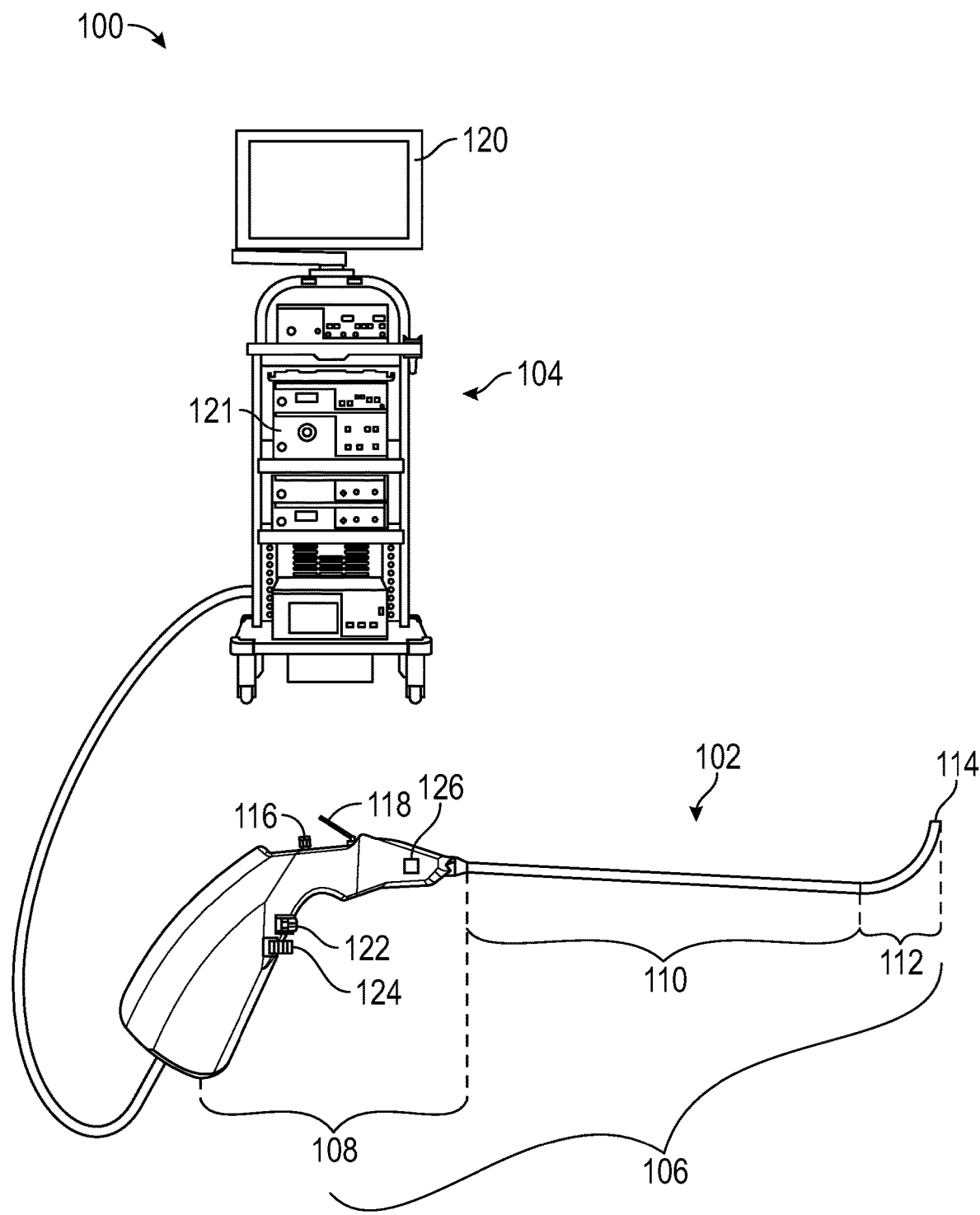
FIG. 1 illustrates an example of portions of a system that can include an endoscope for use in a procedure to remove material from a target site.

A fluorescence response signal from the target site can be used to determine the characteristic of a target site. For example, a first LED light source can be used to illuminate the target site, such as with a first illumination wavelength, such as in a range between about 180 nm to about 800 nm. Material at the surgical target site can absorb energy from the light. For example, such material at the surgical target site can include tissue, a kidney stone, a pancreobiliary, a gallbladder stone, or the like. In response to illumination energy absorption, the material at the target site can emit one or more fluorescence response photons. The fluorescence response emission can be at a second wavelength, which is different from the first wavelength of illumination light emitted from the light source and absorbed at the target site. When the light source is pulsed between "on" and "off" states, when the illumination light source is in the "off" state, fluorescence response photon emission can be detected. This can help to avoid (or at least reduce) saturation of the detected fluorescence response signal due to contemporaneous presence of the illumination light from the illumination light source). The fluorescence response emission can be analyzed, such as spectroscopically or otherwise, and can be used to characterize of the tissue. This tissue characterization, in turn, can be used to adjust one or more parameter settings FIG. 1 shows an example of portions of a system 100 that can be used to treat or remove material from a target site, such as a surgical site. The system 100 can include an endoscope 102, in communication with an imaging platform 104 that can be used to provide an image of a target site to a practitioner, such as a medical professional. For example, the endoscope 102 can include a nephroscope, a cystoscope, a ureteroscope, or any other type of endoscope. The endoscope 102 can include a body 106 at least partially insertable into a patient. The body 106 can include a handle, a hub, or other grippable proximal portion 108, an elongate rigid portion 110 extending from the grippable proximal portion 108, and a flexible distal portion 112 extending distally from the elongate rigid portion 110 to a distal end 114. An articulation controller 116 can be located on the grippable proximal portion 108. The articulation controller 116 can be actuatable by a practitioner when the practitioner grips the grippable proximal portion 108. The articulation controller 116 can adjust the position of the flexible distal portion 112. The grippable proximal portion 108 can also have an electrical port 118 that can be coupled (e.g., via one or more wires extending along the body 106) to a substrate 200 (FIG. 2) that can be located at the distal end 114 of the body 106. While examples described herein include an endoscope, the present subject matter is not limited to an endoscope or devices implementing a spectroscopy techniques, but can include using other types of treatment devices.

The endoscope 102 can include a visualization system at the distal end 114 of the body 106 to allow a practitioner to visualize a target site. The visualization system can illuminate a working area of material, such as tissue or calculi (e.g., kidney or pancreobiliary or gallbladder stones) and can generate a video image or one or more static images of the illuminated area of the material. The visualization system can direct the video image to a display device 120.

Figure 2:
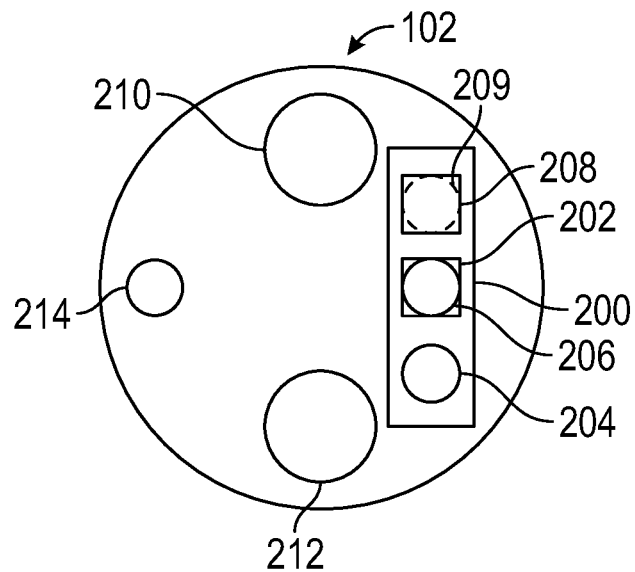
FIG. 2 illustrates an example of various features of the endoscope of FIG. 1.

The visualization system can include at least one light source 202 located on the substrate 200 at the distal end 114 of the endoscope 102 as shown in FIG. 2. Alternatively, the light source may be located at the proximal end of the endoscope 102 (or separate from the endoscope 102) and transmit light to the distal end of the endoscope via, for example, a optical fiber or an illumination channel. The substrate 200 can include one or more of a circuit board, a hybrid chip, a ceramic component, or other suitable components or elements. The electrical port 118 can receive electrical power to power the circuit board on the substrate 200. The circuit board or other substrate 200 can communicate digital video signals wirelessly to the display device 120. The circuit board or other substrate 200 can mechanically support and electrically power the light source 202. In addition to the circuit board or other substrate 200 and the light source 202 being located the distal end 114 of the endoscope 102, an imaging sensor 302 can also be located at the distal end 114 of the endoscope 102. For example, the imaging sensor 302 can include an imaging camera, such as a CCD or CMOS camera sensitive to ultraviolet (UV), visible (VIS) or infrared (IR) wavelengths.

The circuit board or other substrate 200, along with the light source 202, can alternatively be located at a proximal portion 126 of the endoscope 102, such as at the grippable proximal portion 108 of the endoscope 102. The substrate 202 can include the components and the functionality described herein when located at either the distal portion 114 or the proximal portion 126 of the endoscope 102.

The light source 202 can include a light-emitting diode (LED) and a xenon light, among others. The light source 202 can include a LED. The LED can output a white light that can include one or more of a blue wavelength, a green wavelength, a yellow wavelength, or a red wavelength. The light source 202 can include LEDs that can emit light at different wavelengths, such as to help obtain one or target characteristics at a target site, such as further described below. In some examples, the light source 202 can function as a user-visible aiming light for the endoscope 102, which a practitioner can visibly observe and use to determine where a laser of the endoscope 102 is pointing, while at the same time using the aiming light for illuminating a target site to detect one or more fluorescence response signals from the target site, such as described further herein.

The light source 202 can emit light directed distally away from the distal end 114 of the body 106, such as to illuminate material at the target site. As described above, the light source may be an external light source (e.g., outside of the endoscope 102) that provides light transmitted through the body 106 of the endoscope 102, such as through an optical fiber or fiber bundle, to illuminate the material at the target site. The light source 202 can emit white light to illuminate the calculi. White light can allow the practitioner to observe discolorations or other color-based effects on the material at the target site at or near the distal end 114 of the body 106. The light source 202 can additionally or alternatively emit blue light to illuminate the material at the target site. Blue light can be well-suited to show thermal spread and can thereby be used to detect actual or potential thermal damage in the material. Other color wavelengths or bands, such as red, amber, yellow, green, or others, can be used. The light source 202 can be coupled to an optical lens 206 that can refractively or otherwise angularly adjust the light output from the light source 202. The optical lens 206 can narrow the beam of light output from the light source 202. Moreover, the optical lens 206 can widen the beam of light output from the light source 202. Such an angular adjustment can help ensure that the material at the target site is sufficiently illuminated within a specified angular field of view.

Figure 5:
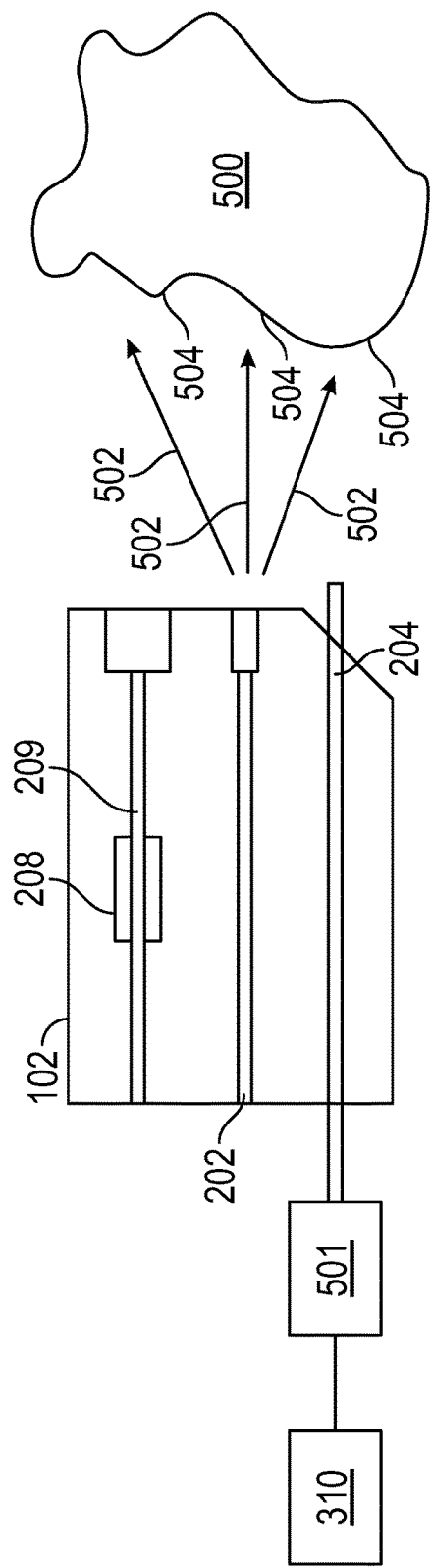
FIG. 5 illustrates an example of illuminating a target site, such as with pulsed light.

An optical fiber 204 or fiber bundle can be integrated into the endoscope 102. The optical fiber 204 can extend along a fiber channel (which may be a working channel or a channel different from the working channel) in the body 106 of the endoscope 102. The optical fiber 204 can be separate from the endoscope 102. The optical fiber 204 can be fed along the fiber channel of the endoscope 102 before or during use and retrieved from the fiber channel of the endoscope 102 after use. The optical fiber 204 can be coupled to a material removal device 501 (FIG. 5), such as a laser emitter, external to the endoscope 102, such as via a suitable connector and can deliver a laser beam to material at a target site for material removal. The target site can include kidney stones for the laser beam to ablate into stone fragments. The target site can include tissue that the laser beam can ablate from the target site. The material removal device 501 is not limited to a laser beam. For example, a ultrasound transducer can be used to ablate soft tissue and/or hard tissue from a target site.

The laser beam generated by the laser emitter of the material removal device 501 can have a wavelength that corresponds to a spectral peak of absorption of human blood and saline, such as 2100 nm, 1942 nm, and others. For example, wavelengths in the range between 1900 nm and 3000 nm can correspond to a spectral region in which water is light-absorbing, while wavelengths between 400 nm and 520 nm can correspond to a spectral region in which oxy-hemoglobin and/or deoxy-hemoglobin is light-absorbing. For example, the material removal device 501 can include a thulium fiber laser that can produce a laser beam at a wavelength of 1908 nm or 1940 nm. The material removal device 501 can include a thulium:yttrium-aluminum-garnet (YAG) laser that can produce a laser beam at a wavelength of 2010 nm. The material removal device 501 can be a holmium:YAG laser that can produce a laser beam at a wavelength of 2120 nm. The material removal device 501 can include an erbium:YAG laser that can produce laser beam at a wavelength of 2940 nm. Other wavelengths in these ranges can also be used.

Moreover, the material removal device 501 can include a neodymium:(YAG) (Nd:YAG) laser that can produce a laser beam at a wavelength of 1064 nm. In general, delivering a laser beam that has significant light-absorption in blood and saline can be beneficial, because such laser beam can be less impactful on surrounding tissue. This can help reduce or eliminate damage to different material near the target site. The laser can provide light having an output power that falls within a suitable range of output power, such as between 20 watts and 120 watts, for example. The optical fiber 204 can include a multi-mode fiber or a single-mode fiber.

The visualization system can include an image capture device 208 that can be located on the circuit board or other substrate 200, which can mechanically support and electrically power the image capture device 208. The image capture device 208 can include an imaging sensor, such as a camera, and can capture a video image or one or more static images of the illuminated material at the target. The video image can be in real-time, or nearly real-time with a relatively short latency for processing, so that the practitioner can observe the material at the target site and the surrounding tissue as the practitioner manipulates the body 106 and controls of the endoscope 102. The image capture device 208 can include a lens and a multi-pixel photodetector sensor, such as a focal plane array (FPA) that can be located at a focal plane of the lens. The sensor can include a color sensor, such as an RGB sensor that provides intensity values for red light, green light, and blue light for each pixel in the video image. The circuit board can produce a digital video signal representing the captured video image of the illuminated material at the target site. The digital video signal can have a video refresh rate of 10 Hz, 20 Hz, 24 Hz, 25 Hz, 30 Hz, 40 Hz, 50 Hz, 60 Hz, or another suitable video refresh rate. In further examples, the image capture device 208 can be Spectroscopic Charge Coupled Device (CCD) or a complementary metal-oxide-semiconductor (CMOS) camera.

In further examples, the image capture device 208 can capture spectra emitted from a target site and provide the spectra to a feedback analyzer 121 of the imaging platform 104 such as via an optical path 209. The optical path 209 can include a multi-mode optical fiber or a single-mode optical fiber or fiber bundle. As will be discussed further below, the feedback analyzer 121 can be configured to determine a spectra of a fluorescence signal. Furthermore, as will be detailed further below, the feedback analyzer 121 can be configured to identify a characteristic of a target site using the identified spectra.

The endoscope 102 can also include an irrigation lumen 210 and a suction lumen 212 (each of which may be the same or different from the working channel). The irrigation lumen 210 can provide irrigant to a target site during a procedure. Furthermore, the suction lumen 212 can remove irrigant and waste from a target site. The endoscope 102 can optionally include a tube, chamber, additional working channel, or other passage 214 within the body 106 of the endoscope 102. A practitioner can use the passage 214 to deploy any type of separate tool or instrument, such as a lithotripter, a stone retrieval basket, or another suitable tool or instrument.

Returning to FIG. 1, the endoscope 102 can include a laser controller 122 such as can be located on the grippable proximal portion 108. Alternatively, the laser controller 122 may be separately located from the endoscope 102. The laser controller 122 can toggle a state of the laser beam between an operational state ("on" state) and a non-operational state ("off" state). For example, the laser controller 122 can direct a wired and/or wireless laser control signal to a laser that is located external to the endoscope 102. The laser control signal can turn on or turn off the laser. In some implementations, a practitioner can use the laser controller 122 to adjust one or more settings of the laser, such as the output power, pulse width, pulse shape, and/or pulse frequency.

During a procedure, the practitioner can manipulate the laser controller 122 such that the laser can be operational for a period of time, such as one minute, two minutes, three minutes, four minutes, or any suitable length of time. During the period of time of laser operation, the practitioner can manipulate the body 106 of the endoscope 102 to move the delivered laser beam across a surface of the material at the target site. The laser power level and the exposure times can be such that the practitioner can safely switch the laser power on and off by hand, without a need for a mechanized or automated exposure mechanism. The laser power can also be low enough such that incidental exposure of surrounding tissue can avoid impacting the surrounding tissue. Furthermore, the endoscope 102 can include or couple to a flush controller 124, which can be used to control the flow of irrigant through the irrigation lumen 210 and suction through the suction lumen 212.

Figure 3:
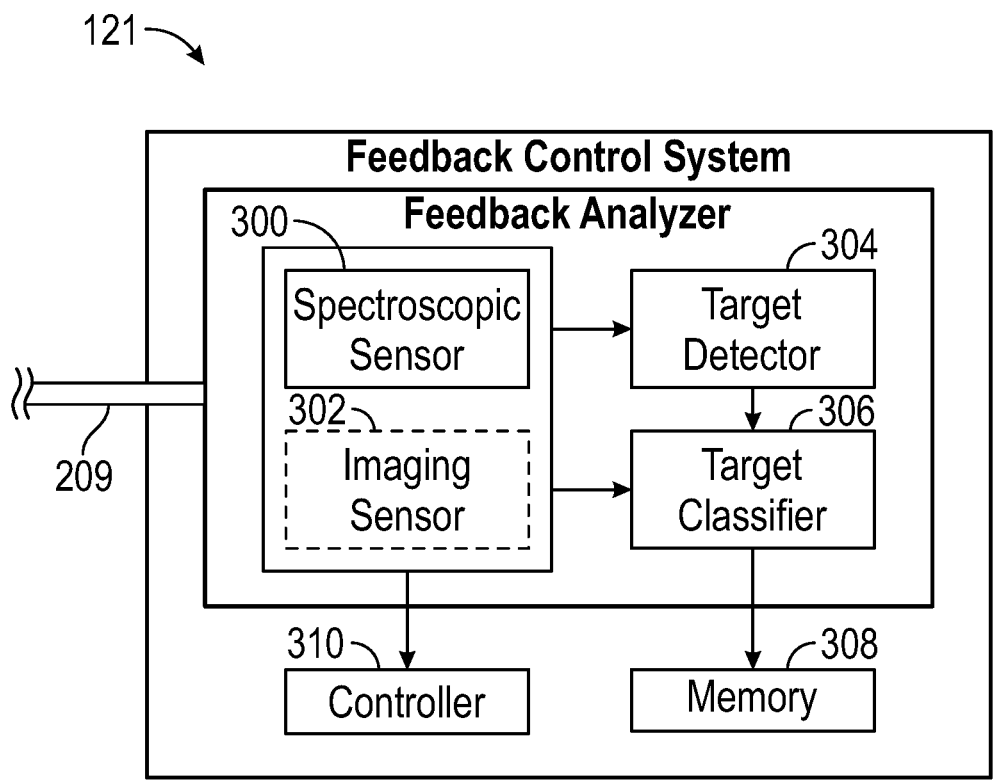
FIG. 3 illustrates an example of portions of a feedback analyzer of the system of FIG. 1.

FIG. 3 shows features of the feedback analyzer 121. The feedback analyzer 121 can include a light detector 300 configured to detect a light signal (e.g., fluorescence signal) from a target structure and analyze the received signal to determine a characteristic of the target. The signal processing and analysis can include analysis of, for example, a fluorescence intensity, a fluorescence excitation spectrum, a fluorescence emission spectrum, a fluorescence decay time, or other characteristic associated with the detected fluorescence signal. For example, the feedback analyzer 121 can generate one or more spectroscopic properties from the detected signal. The spectroscopic properties can include one or more fluorescence characteristics and, additionally or alternatively, one or more other characteristics such as reflectivity, reflectance spectrum, absorption index, or the like. The light detector 300 can include, among other things, a spectroscopic sensor such as a Fourier Transform Infrared (FTIR) spectrometer, a Raman spectrometer, a UV-VIS spectrometer, a UV-VIS-IR spectrometer, or a fluorescence spectrometer, among others. Furthermore, light sensors, such as those based on CMOS, CCD technology for converting photons to electrical signals using photodiodes are suitable. Light detectors can be individual photodiodes, or an array of photodiodes such as those used in CMOS or CCD imagers for digital cameras. Both kinds of these devices provide an electrical signal that corresponds to the intensity of an optical signal at particular wavelengths and are suitable for conducting spectroscopy. Additionally, any type of spectrometer or spectrophotometers that can collect light intensity versus wavelength can be used. The light detector 300 can correspond to a spectroscopy modality or technique. For example, UV-VIS spectroscopy can be used to gather information from fluorescence light or reflection light from a target object or site, such as can be similar to the information yielded from the eye or a color image made by a high resolution camera, but more quantitatively and objectively. For example, the spectroscopy can provide information about the material based on reflected light from the target since light reflection and absorption can depend on its chemical composition and surface properties. Information about both surface and bulk properties of the sample can be obtained using this technique. The reflection spectroscopy can be used to recognize a composition of hard or soft tissue. FTIR spectroscopy can be used for rapid materials analysis and has relatively good spatial resolution and can give information about the chemical composition of the material. Raman spectroscopy can be used for identifying hard and soft tissue components. As a high spatial resolution technique, Raman spectroscopy is also useful for determining spatial distribution of components of a material within a target object.

The light detector 300 can also be used with fluorescence spectroscopy. Fluorescence spectroscopy is a type of electromagnetic spectroscopy that analyzes fluorescence from a sample. Fluorescence spectroscopy can involve using a beam of illumination light, such as ultraviolet, that excites a material component at the target site and causes the material component to emit fluorescence response light, typically in visible or IR area. Fluorescence spectroscopy can be applied for analysis of some organic components, such as to help distinguish between hard and soft tissue. The light detector 300 can include more than a single type of spectrometer or imaging camera, such as to permit a broader capability of sensing and detecting various features (e.g., carbonized and non-carbonized tissue, vasculature, or the like). Moreover, the imaging sensor can use one or more imaging capabilities of the endoscope 102 that are available for use during a therapeutic or diagnostic procedure. For instance, the endoscope 102 can be used for visualizing an anatomical feature during a therapeutic procedure (e.g., laser ablation of a tumor or a kidney stone). In such cases, the endoscopic imaging capabilities of the endoscope 102 can be used or augmented by the light detector 300. For example, the endoscope 102 can provide narrow band imaging suitable for enhanced visualization of one or more anatomical features (e.g., lesions, tumors, vasculature, stone, or the like). Combining the light detector 300 with the endoscopic imaging (white light and/or narrow band imaging) can help in detecting one or more tissue properties, such as a level of carbonization, which information can be used to precisely control the delivery of therapeutic treatment. For example, the light detector 300 can be operatively coupled to an optical path 209. Thus, optical signals, such as fluorescence signals received at the optical path 209, can be provided to the light detector 300.

The feedback analyzer 121 can include the imaging sensor 121 along with one or more of a target detector 304 or a target classifier 306. The target detector 304 can be configured to identify a target structure as one of a plurality of structure categories, such as can include using one or more fluorescence properties of the detected fluorescence response signal and/or one or more spectroscopic properties such as those generated by the light detector 300 as described above. Moreover, the target detector 304 can be configured to identify a target structure as one of a plurality of structure categories in combination with the imaging properties detected by the imaging sensor 302. For example, the target detector 304 can identify a target characteristic, such as to help characterize a target structure as a category of calculus structure or as a category of anatomical structure using one or more fluorescence and/or spectroscopic properties. Examples of a calculus structure can include stones or stone fragments in various stone-forming regions such as a urinary system, the gallbladder, nasal passages, the gastrointestinal tract, the stomach, or the tonsils. Examples of the anatomical structure can include soft tissue (e.g., muscles, tendons, ligaments, blood vessels, fascia, skin, fat, and fibrous tissues), hard tissue such as bone, connective tissue such as cartilage, among others.

The feedback analyzer 121 can generate a response signal spectrum, such as a reflectance spectrum using a received reflected signal and can extract one or more spectral features from the reflectance spectrum. The response signal spectrum can include reflectance intensities over a plurality of wavelengths. Reflectance can be determined as a fraction of incident electromagnetic power reflected at a material interface. Reflectance can represent the effectiveness of the material surface in reflecting electromagnetic radiation. In addition to reflectance, the response signal spectrum can also represent illumination energy absorbed at a surgical site, and re-emitted at a fluorescence response signal wavelength, including for a short time after the surgical site is no longer being illuminated by a light source. The reflectance spectrum can be formatted as a data array or a graphical representation such as a spectral reflectance curve. For example, the reflectance spectrum can represent reflectance over wavelengths in a range of approximately 400-1000 nm.

The articulation controller 116, the laser controller 122, the flush controller 124, the feedback analyzer 121 and/or the target detector 304 described herein may be implemented in a single controller or in separate controllers. In addition, two or more of these may be implemented in a single controller while the others are implemented in separate controllers. The controller(s) used herein may be implemented in hardware, software, or a combination of the two. The software may be written in any of a number of high-level languages such as FORTRAN, PASCAL, JAVA, C, C++, C#, BASIC, various scripting languages, and/or HTML. Additionally, the software can be implemented in an assembly language directed to the microprocessor resident on a target computer. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM. The hardware circuitry may be implemented using, for example, one or more FPGA, CPLD or ASIC processors.

Figure 4:
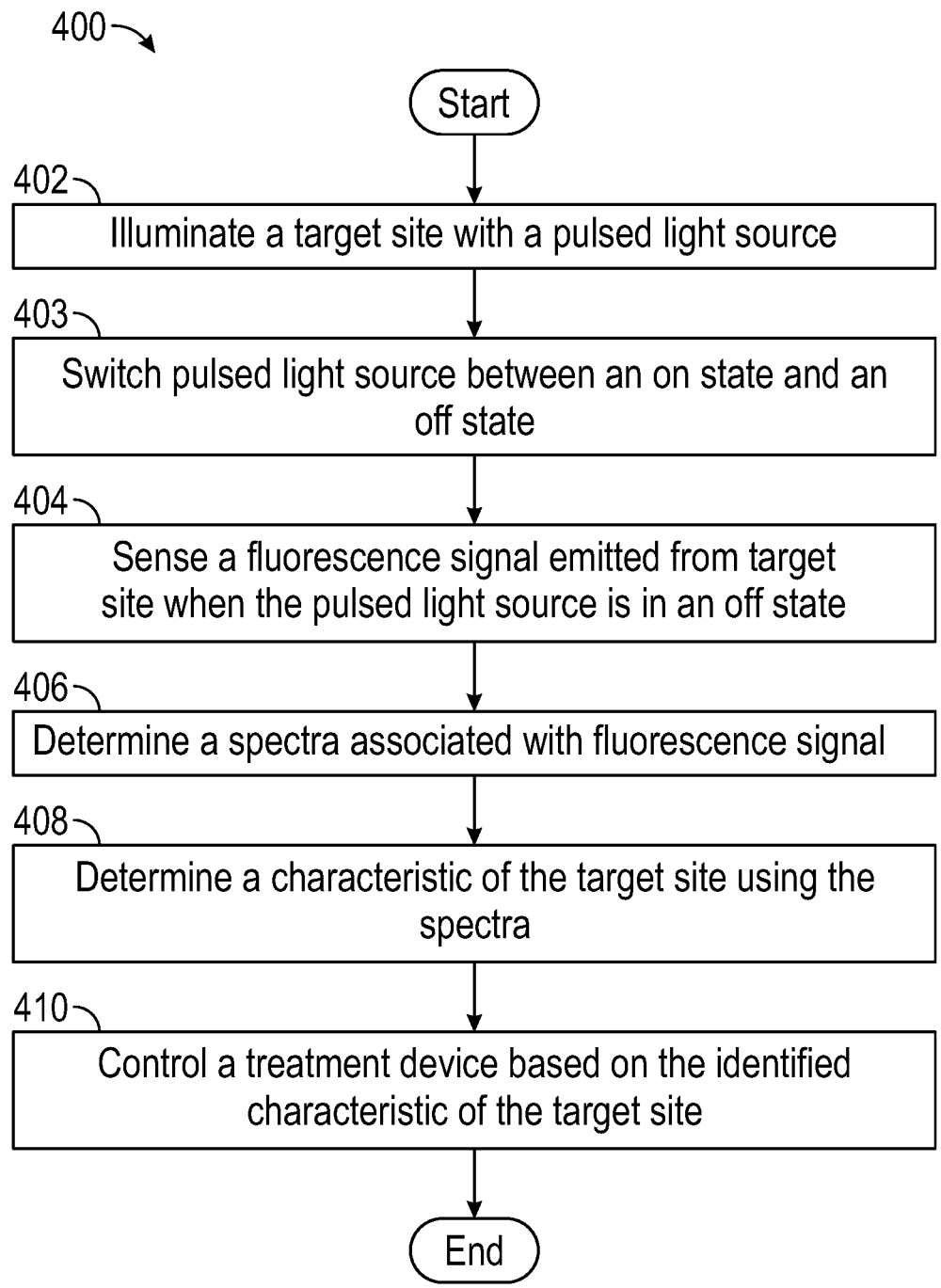
FIG. 4 shows an example of portions of a method of determining a characteristic of a target site.

FIG. 4 shows examples of a method 400 of determining a material characteristic at a target site. At 402, a target site can be illuminated with a light source. The light source can be periodically or randomly activated and deactivated, such as to generate pulsed illumination. For example, at 402, the light source can be activated to illuminate a target (i.e., the light source is in an "on" state). To further illustrate examples associated with the method 400 and referred to herein as the "first illustration," now making reference to FIG. 5, at 402, the endoscope 102 can be controlled to illuminate a surgical target site 500 with pulsed light 502. The light source 202 can provide white light or other broadband light from an LED to the surgical target site 500 at 402. In the first illustration, broadband or white light can be used. White light can include all wavelengths of light in the visible spectrum at equal intensities. Thus, the white light can include the wavelengths that can excite fluorophores at the surgical target site 500. In the first illustration, a surface 504 of the surgical target site 500 is illuminated with the pulsed light 502. More specifically, the surgical target site surface 504 absorbs energy, such as photons, which causes excitation, such as the excitation of fluorophores at or below the surgical target site surface 504.

In FIG. 4 at 403, the light source 202 can be switched from an "on" state in which the LED emits light to an "off" state where the LED does not emit light. During such time (i.e., when the pulsed light source is in the "off" state), at 404, a fluorescence signal emitted from the target site is detected by the light detector 300 of the feedback analyzer 121 in response to the illumination. Here, since the pulsed light source is in the "off" state, fluorescence signals from the target need not be obscured or saturated by the wavelengths of illumination energy that energizes the target site. This can help permit more accurate determination of the target characteristic of the target site based on the detected fluorescence signal(s).

Figure 6:
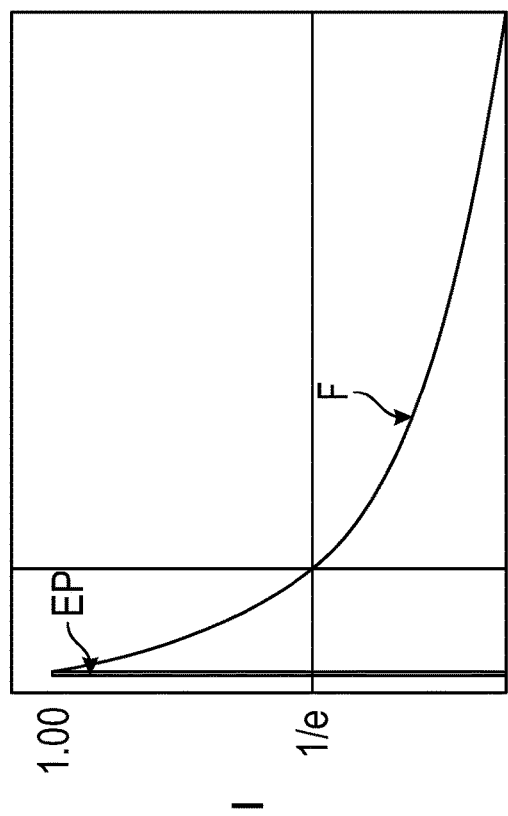
FIG. 6 illustrates an example of fluorescence response emissions of fluorophores that are excited by illumination light.

The material at a target site can include fluorophores that can be excited by specific wavelengths in the light emitted from a light source. When fluorophores are excited, they can emit light for a short duration of time, as shown with reference to FIG. 6. In particular, when an excitation pulse EP, such as pulsed broadband or white light, is directed toward material including fluorophores, the energy absorbed by the material including fluorophores decays over a time T where the decay time is proportional to an intensity I associated with the light used to illuminate the material having the fluorophores, as shown with fluorescence F. The fluorescence F can be used to determine a fluorescence intensity and a fluorescence excitation spectra. Furthermore, the fluorescence F can be used to determine a fluorescence emission spectra and a fluorescence decay time. A CCD or CMOS or other photosensor can be used to detect the fluorescence F before the intensity associated with the fluorescence F decays to a point below which a CCD or CMOS or other photosensor cannot detect the fluorescence F. At 404, the energy absorbed can be detected as a fluorescence response signal.

At 403, the light source 202 can be switched from the "on" state in operation 402 to an "off" state. When the light source 202 is switched to the "off" state, the method 400 can perform the operation 404 in the first illustration. In particular, at 404, energy absorbed by the surgical target site surface 504, generically shown as energy 700 in FIG. 7, can be emitted as fluorescence signals 702, which can correspond to a wavelength emitted from the surgical target site surface 504. Thus, when the surgical target site surface 504 is energized, the fluorescence signals 702 can correspond to a wavelength emitted from the energized surgical target site surface 504. In the first illustration, the fluorescence signals 702 can be transmitted to the feedback analyzer 121 via the optical path 209, optical fiber 204, and/or passage 214 such that the feedback analyzer 121 can analyze the detected fluorescence signals 702.

Once the fluorescence signals are detected at 404, the method 400 optionally performs an operation 406, where a fluorescence property (e.g., a fluorescence intensity, a fluorescence excitation spectrum, a fluorescence emission spectrum and/or a fluorescence decay time) and/or a spectra associated with the fluorescence signal is determined. The feedback analyzer 121 can be used to determine the spectra associated with the fluorescence signal as discussed above. Additionally or alternatively, spectra can be extracted from a reflectance spectrum or a normalized reflectance spectrum of a particular calculus structure of a target site. Such reflectance features can include a reflectance spectrum (or normalized reflectance spectrum) at a specific wavelength or over a wavelength range, a statistical value calculated from the reflectance spectrum (e.g., a variation of reflectance over two or more different wavelengths, a rate of change of reflectance over a range of wavelengths, or the like), or a graphical feature representing the morphology of at least a portion of the spectral reflectance curve (e.g., a slope, a curvature, a segment of the curve, or the like). The calculi reflectance features and the tissue reflectance features can be stored in memory circuitry of the imaging platform 104.

After determining a spectra associated with the fluorescence signal at 406, then at 408 a characteristic of the target site can be determined using the fluorescence property and/or spectra. For example, at 408, to determine a characteristic of the target site, the target detector 304 can additionally or alternatively extract one or more target reflectance features from the reflectance spectrum determined at 406. The target detector 304 can identify the target as a calculus structure if the target fluorescence property and/or reflectance feature exceeds a feature threshold or falls within a value range by comparing the fluorescence property and/or reflectance feature with the predetermined threshold or the value range based on the characteristic. Additionally, the target detector 304 can identify the target as kidney tissue if the target fluorescence property and/or reflectance feature falls below the predetermined threshold or falls outside the value range based on the characteristic. The predetermined threshold or value range can be determined using the calculi fluorescence properties and/or reflectance features and the tissue fluorescence properties and/or reflectance features obtained in vitro and/or in vivo before the procedure. Moreover, the threshold or the value range associated with an individual characteristic of the target can be stored in a lookup table at the imaging platform 104. In an example, the threshold can be determined as one that separates the calculi fluorescence properties and/or reflectance features and the tissue fluorescence properties and/or reflectance features with a specified margin.

At 408, the target detector 304 can trend the fluorescence properties and/or reflectance intensities of material at a target site over a range of wavelengths and determine the material based on the trend of the fluorescence properties and/or reflectance intensities (or the "fluorescence trend" or "reflectance trend"). For example, the fluorescence trend and/or reflectance trend can be generated within a first range of 400-550 nm. The material can be determined be a calculus structure if a monotonic increase fluorescence trend and/or reflectance trend is present in a first wavelength range. The material can be identified as kidney tissue if no monotonic increase of the fluorescence trend and/or reflectance trend is present in the first wavelength range. In another example, the fluorescence trend and/or reflectance trend can be generated within a second range of 650-700 nm. The material can be determined to be a calculus structure if a monotonic increase of the fluorescence trend and/or reflectance trend is present in the second wavelength range. The material can be determined to be kidney tissue if a monotonic decrease of the fluorescence trend and/or reflectance trend is present in the second wavelength range.

A template matching approach can be used by the target detector 304 to determine the material at the surgical site to be a calculus structure or an anatomical structure. The target fluorescence property and/or reflectance feature can be compared to at least one of the calculi fluorescence properties and/or reflectance features or at least one of the material fluorescence properties and/or reflectance features stored in memory 308 of the feedback analyzer 121 to determine if a matching criterion is satisfied. For example, the material at the surgical site can be determined to be a calculus structure if a dissimilarity metric between the target fluorescence property and/or reflectance feature and the calculi fluorescence property and/or reflectance feature is below a first similarity threshold or identified as kidney tissue if a dissimilarity metric between the target fluorescence property and/or reflectance feature and the tissue fluorescence property and/or reflectance feature is below a second similarity threshold.

The target classifier 306 can use intra-category difference in reflectance spectra among different structure types of the same category as described above to classify the material at the target site as one of a plurality of structure types of the same category, such as a particular tissue type within an identified category of anatomical structure, or as a particular calculus type within an identified category of calculus structure. The classification can be based on one or more of reflectance at a specific wavelength, a statistical feature (e.g., variance or other variation metric) of reflectance over two or more different wavelengths, or a graphical feature generated from a graphical representation of the reflectance spectrum. For example, in instances in which the target site includes stones, based on the distinct normalized reflectance spectra among various stone types, the target classifier 306 can compare a normalized reflectance at a specific wavelength (e.g., 550 nm) or wavelength range to one or more thresholds to classify the stones at the surgical site as a particular stone type.

One or more spectroscopic properties can be used by the target classifier 306 to classify a determined anatomical structure as one of plurality of tissue types. For example, the target classifier 306 can be configured to classify determined renal tissue as one of tissue types with distinct anatomical locations, such as calyx tissue, cortex tissue, medulla tissue, or ureter tissue. For example, based on the distinct normalized fluorescence and/or reflectance spectra among various tissue types, the target classifier 306 can classify the tissue at the surgical site as a particular tissue type based on a comparison between the normalized fluorescence and/or reflectance at a specific wavelength (e.g., 480 nm) or wavelength range and one or more fluorescence and/or reflectance thresholds.

The target classifier 306 be configured to classify a determined anatomical structure as normal tissue or abnormal tissue (e.g., cancerous tissue). Normal and cancerous tissue can demonstrate distinct fluorescence and/or reflectance spectra with different shapes and peak locations (i.e., the wavelength at which the fluorescence and/or reflectance spectrum reaches a peak value across a wavelength range). The classifier 306 can be configured to classify or determine anatomical structure as a treatment area (e.g., tumor or polyp intended for removal) or a non-treatment area (e.g., blood vessels, muscle, etc.). The classification can be based on one or more of fluorescent and/or reflectance at a specific wavelength, a statistical feature (e.g., variance or other variation metric) of fluorescent and/or reflectance over two or more different wavelengths, or a graphical feature (e.g., a slope) generated from a graphical representation of the fluorescence and/or reflectance spectrum. Cancerous tissue can have different spectra in comparison to non-cancerous tissue. Thus, the target classifier 306 can classify the tissue based on the spectra.

The feedback analyzer 121 can also include a controller 310. The controller 310 can automatically control the laser 510 or other material removal device 501. This can obviate the need for a practitioner to manually control the material removal device 501.

Returning to the first illustration, at 406, the fluorescence signals 702 detected at 404 are transmitted to the feedback analyzer 121, which determines that a spectra of the target has a specific spectra (e.g., 460 nm to 700 nm) when illuminated with the light source (e.g., having a wavelength in a range of 450 nm to 500 nm). Moreover, at 408, the feedback analyzer 121 identifies the target characteristic at the surgical site (e.g., the type, material, composition, composition profile, structure, hardness, etc.) based on the detected fluorescence signals (e.g., the shapes and peak locations of the spectra).

At 410, a treatment device, can be optionally controlled based on the material characteristic identification at 408. For example, a control signal can be used to adjust various parameter settings of the apparatus, such as an energy emission from the apparatus. For example, where the apparatus includes a laser system, the parameter settings can include an energy of a laser pulse, pulse frequency, laser power, and a pulse mode, a pulse width of a laser pulse, a pulse shape of a laser pulse, a peak power of a laser pulse, or a pulse frequency representing a number of laser pulses per unit time, etc. Here, the emission can relate to a laser associated with these parameters. Furthermore, 410 can be performed in real-time, such that one or more control signals can be sent by the controller 310 to the apparatus to adjust the apparatus during a surgical procedure that removes tissue or any other type of detritus from a target site.

For example, if the material at the target site is determined to include cancerous tissue (or, in some embodiments, a kidney stone) and the apparatus is a laser device, the controller 310 can control the laser to deliver a laser beam that can remove the cancerous tissue (or, in some embodiments, fragment the kidney stone). Thus, the controller 310 can control a treatment device based at least in part on a determined first characteristic. Returning to the first illustration, here, the material removal device 501 can include a Nd:YAG laser. Additionally, as noted above, the feedback analyzer 121 identified the tissue at the surgical site as being cancerous based on shapes and peak locations of the spectra. Thus, at 410 in the first illustration, the controller 310 can automatically control the material removal device 501 to emit a laser beam at a wavelength of, for example, 1064 nm to remove the cancerous tissue at the surgical target site 500 such that the material removal device 501 is controlled based at least in part on a first identified target characteristic. As shown in FIG. 8, the automatic controller 310 can send signals 802 to the material removal device 501 to target laser beams 800 at the surgical site 500 via the optical fiber 204. Upon completion of 410, the method 400 is complete; alternatively, operations 402-410 may iteratively performed until a particular treatment effect is achieved (e.g., when a kidney stone is completed fragmentated or dusted).

Figure 9:
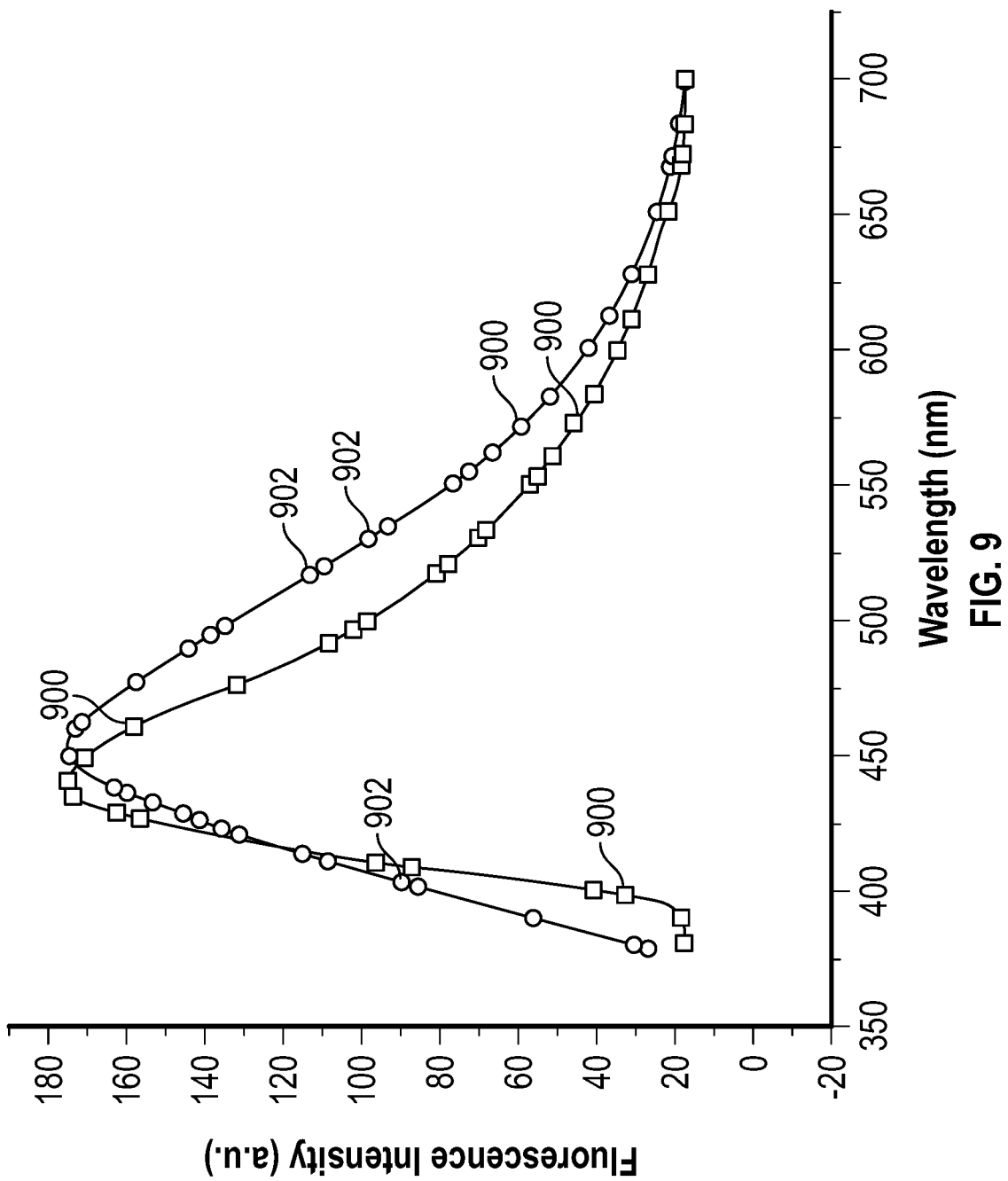
FIG. 9 illustrates an example of a difference of fluorescence response intensity as a function of wavelength for tumoral tissue and healthy tissue.

When the light source 202 is switching between an "on" state and an "off" state, a different excitation wavelength can be emitted during the time in which the light source is an "off" state. For example, either the light source 202 or the material removal device 501 can be capable of emitting the different excitation wavelength. To further illustrate, the different excitation can have a 370 nm wavelength and can produce a fluorescence between about 425 nm and 550 nm, as shown in FIG. 9. In FIG. 9, when tumoral tissue exists, the spectra will reflect this, as shown at 900. Moreover, the spectra can also reflect the presence of healthy tissue, as shown at 902.

The method 400 can be performed during a first time period where a first spectra associated with a fluorescence signal is determined and a characteristic of material at the surgical target site 500 is determined during a first time period and the material removal device 501 and a first control signal, such as the control signal 802, is sent to the material removal device 501 from the controller 310. Here, the material removal device 501 can be controlled in real time based on the determination made during the first time period. During a second time period, the method 400 can be repeated where a second spectra associated with a fluorescence signal is determined and a second characteristic of material at the surgical target site 500 is determined during the second time period and the material removal device 501 is controlled in real time based on the determination made during the second time period. In particular, the controller 310 can send a signal 804 (FIG. 8) based on the determination made during the second time period where a second characteristic of the target can be determined during the second time period using the principles discussed herein. Moreover, the second characteristic can be different from the first characteristic or the same as the first characteristic. For example, the characteristic can be determined to be different from what was determined in the first time period. Here, the laser can be controlled based on the identification of the characteristic during the second time period. Also, the second control signal 804 and the second adjustment after the second time period based on the second control signal 804 can be made in real time.

The apparatus can be controlled by making a second adjustment to a laser. The second adjustment can include adjusting one or more parameters of the laser such as an energy of the laser pulse, pulse frequency, laser power, and a pulse mode. Moreover, in some examples, a parameter adjusted after the first time and a parameter adjusted after the second time can be different. For example, after the first time period, an energy of the laser pulse can be adjusted while the after the second time period, a pulse frequency can be adjusted.

A characteristic of a surgical target site can be determined by detecting fluorescence when a broadband or white light source is in an "off" state after illuminating the surgical target site in "on" state. Multiple light sources (e.g., light emitting diodes or LEDs) can be pulsed to illuminate a surgical target site and a fluorescence response signal can be measured after each light source is pulsed. For example, each light source (e.g., LED) of the multiple light sources can sequentially emit a different color with a sufficiently high rate such that a combination of the different colors can be perceived by the human eyes as white light. For three light sources, where a first light source emits red light, a second light source emits green light, and a third light source emits blue light, the combination of the red, green, and blue light sources create white light. Moreover, while the colors red, green, and blue are discussed herein to create white light, any light colors can be used to determine a characteristic of a surgical target site. A spectra and a characteristic of the target at a surgical target site can be determined based on the fluorescence emitted in response to all the light sources illuminating the surgical target site such as further described in FIG. 10.

Figure 10:
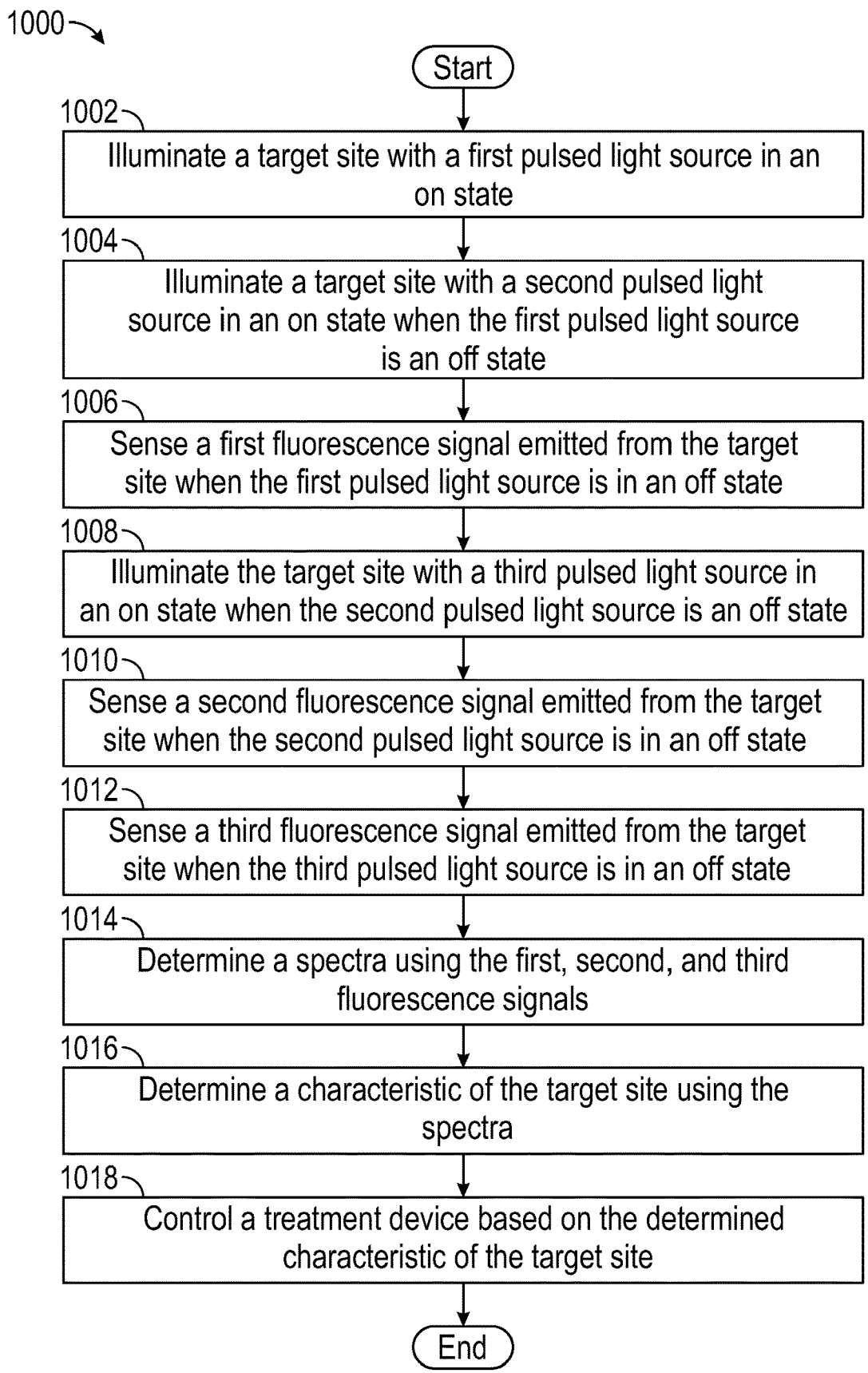
FIG. 10 shows an example of determining a characteristic of a target site.

FIG. 10 shows an example of a method 1000 of identifying a characteristic of a surgical target site using multiple LEDs, each emitting light at a different wavelength. The LEDs can be sequentially switched on and off at a sufficiently high rate such that the combination of the different colors is perceived by the human eyes as white light. Fluorescence signal(s) in response to the previously activated LED can be detected while the current LED (emitting a different wavelength of light) is illuminating the target site. For example, the light source may include a red, a green, and a blue LED. The light source can sequentially emit red, green, blue, red, green, blue . . . light with a sufficiently high frequency during the laser procedure. While the green or blue LED is currently emitting the light, the fluorescence signal(s) in response to the previously emitted red light can be detected and analyzed. At 1002, the target site can be illuminated with a first pulsed light source in an "on" state of the first pulsed light source. For example, the first light source can correspond to a first color, such as the color red. With reference to FIG. 11, at 1002 the endoscope 102 can be controlled to illuminate a surgical target site 1100 with first pulsed, first color light 1102. In the second illustration, at 1002, the light source 202 can provide red light from an LED to the surgical target site 1100 where the red light can correspond to the first pulsed light 1102. In the second illustration, the endoscope 102 can illuminate the surgical target site 1100 by having the light source emit the red light during an "on" state such that a surface 1104 of the surgical target site 1100 is illuminated with the first pulsed, first color light 1102. For example, the surgical target site surface 1104 can absorb photons, which, in turn, can cause excitation of fluorophores, at the surgical target site surface 1104.

At 1004, the target site can be illuminated with a second pulsed, second color light source in an "on" state of the second pulsed light source. For example, the second light source can correspond to a second color, such as the color green. At 1004, the first pulsed light source that illuminated the surgical target site at 1002 is in an "off" state.

During, before, or after 1004, at 1006 a first fluorescence signal can be emitted from the surgical target site and detected when the first pulsed light source site is in an "off" state. The target site can include fluorophores that can be excited by specific wavelengths in light emitted from a light source. Here, while the target site is being illuminated with the second pulsed light source, a fluorescence signal emitted in response to excitation by the first pulsed light signal can be detected. When fluorophores are excited, they can emit light for a short duration of time. At 1006, while the surgical target site 1100 is illuminated with the second pulsed light source, a first fluorescence corresponding to the first pulsed light source can be detected.

At 1004, the endoscope 102 can be controlled to illuminate the surgical target site 1100 with second pulsed light 1106 that has a different color from the first pulsed light 1102. For example, at 1004, the light source 202 can provide green light from an LED to the surgical target site 1100 in an "on" state. Moreover, at 1004, the first pulsed light source is in an "off" state.

In the second illustration, as the surgical target site 1100 is being illuminated with the second pulsed light source while the first pulsed light source is in an "off" state, at 1006, energy absorbed by the surgical target site surface 1104, generically shown as energy 1200 in FIG. 12, can be emitted as first fluorescence signal 1202. In the second illustration, the first fluorescence signals 1202 can correspond to a wavelength emitted from the surgical target site surface 1104. When the surgical target site surface 1104 is illuminated with the first pulsed light 1102, the surgical target site surface 1104 can become energized and resulting first fluorescence response signals 1202 can be detected that can correspond to a wavelength emitted from the energized surgical target site surface 1104. In the second illustration, the first fluorescence signal 1202 can be transmitted to the feedback analyzer 121 via the optical path 209.

At 1008, the target site can be illuminated with a third pulsed light source in an "on" state of the third pulsed light source, for example, illuminating using the color blue. At 1008, the second pulsed light source that illuminated the target site at 1004 can be in an "off" state. Similarly, at 1008, the first pulsed light source that illuminated the target site at 1002 can be in an "off" state.

During, before, or after 1008, at 1010 a second fluorescence signal emitted from the target site can be detected when the second pulsed light source site is in an "off" state, in response to illumination from the second pulsed light source. The fluorescence signal can be emitted from the target site while the target site is being illuminated with the third pulsed light source. At 1010, while the surgical target site 1100 is illuminated with the third pulsed light source, a second fluorescence corresponding to the second light pulse light source can be detected.

After the third pulsed light source is switched to an "off" state (and while the first pulsed light source is switched to the "on" state), at 1012, a third fluorescence signal emitted from the target site can be detected when the third pulsed light source site is in an "off" state. In examples, the fluorescence signal is generated due to excitation from the second pulsed light source.

At 1008, the endoscope 102 can be controlled to illuminate the surgical target site 1100 (FIG. 11) with third pulsed light 1108, such as blue light. At 1008, the light source 202 can provide blue light from an LED to the surgical target site 1100 in an "on" state, with the first and second pulsed light sources in an "off" state.

As the surgical target site 1100 is being illuminated with the third pulsed light 1108 while the first and second pulsed light sources are in an "off" state, at 1010, the energy 1200 absorbed by the surgical target site surface 1104 when the surgical target site 1100 was illuminated with the pulsed light 1106 can be emitted as second fluorescence signal 1204, which can correspond to a wavelength emitted from the surgical target site surface 1104 in response to being excited by the second pulsed light 1106. Thus, when the surgical target site surface 1104 is energized, the fluorescence signals can correspond to a wavelength emitted from the energized surgical target site surface 1104 in response to being illuminated by the second pulsed light 1106. In the second illustration, the second fluorescence signal 1204 can be transmitted to the feedback analyzer 121 via the optical path 209.

After the second fluorescence signal has been detected at 1010, at 1012, a third fluorescence signal 1206 can be detected. Specifically, the third fluorescence signal 1206 can correspond to a wavelength emitted from the surgical target site surface 1104 in response to being excited by the second pulsed light 1106. Accordingly, when the surgical target site surface 1104 is energized, the fluorescence signal can correspond to a wavelength emitted from the energized surgical target site surface 1104 in response to being illuminated by the third pulsed light 1108. In the second illustration, the third fluorescence signals 1206 can be transmitted to the feedback analyzer 121 via the optical path 209.

While the approach 1000 in FIG. 10 depicts detections of the first, second, and third fluorescence signals, it may suffice to detect one or two of these signals to determine one or more target characteristics. For example, it may be sufficient to utilize the first fluorescence signal alone or a combination of the first and third fluorescence signals to determine the target characteristic(s). After the first (and in some embodiments, the second, and third) fluorescence signals are detected at 1012, at 1014, a fluorescence property associated with the detected signal(s) can be determined. For example, a spectra associated with the first, second, and/or third fluorescence signals can be determined, such as using the feedback analyzer 121.

After determining a fluorescence property or spectra associated with the first, second, and/or third fluorescence signals at 1014, at 1016, a characteristic of the target site can be identified using the fluorescence property or spectra. At 1016, to identify a characteristic of the target site, the target detector 304 can extract one or more target fluorescence properties and/or reflectance features from the detected fluorescence signals and/or reflectance spectrum determined at 1014. The target detector 304 can identify the characteristic of the target site as a calculus structure if the target fluorescence property and/or reflectance feature exceeds a feature threshold or falls within a value range by comparing the fluorescence property and/or reflectance feature with the property and/or feature threshold or the value range. The target detector 304 can identify the characteristic of the target site as kidney tissue if the target fluorescence property and/or reflectance feature falls below the property and/or feature threshold or falls outside the value range. The property and/or feature threshold or value range can be determined using the calculi fluorescence properties and/or reflectance features and the tissue fluorescence properties and/or reflectance features. Moreover, the fluorescence property and/or feature threshold or the value range can be stored in a lookup table at the imaging platform 104. The fluorescence property and/or feature threshold can be determined as one that separates the calculi fluorescence properties and/or reflectance features and the tissue fluorescence properties and/or reflectance features with a specified margin.

At 1016, the target detector 304 can trend one or more of the fluorescence properties and/or reflectance intensities of the characteristic at a target site over a range of wavelengths and identify the characteristic based on the trend of the one or more fluorescence properties (or the "fluorescence trend") and/or the reflectance intensities (or the "reflectance trend"), such as previously described above Returning to the second illustration, at 1014, the first, second, and/or third fluorescence signals 1202-1206 detected at 1006, 1010, and 1012 are transmitted to the feedback analyzer 121, which determines that a fluorescence property or spectra of the tissue at the surgical site has a spectra of 460 nm to 700 nm when illuminated with a light source in a range of, for example, 450 nm to 500 nm. In the second illustration, each of the first, second, and third fluorescence signals 1202-1206 can be stored and then simultaneously transmitted to the feedback analyzer 121. Moreover, at 1016, similar to the first illustration, in the second illustration, the feedback analyzer 121 identifies the tissue at the surgical site as being cancerous based on, for example, shapes and peak locations of the spectra.

After the characteristic at the target site is identified at 1016, at 1018, an apparatus, such as a treatment device, can be controlled based on the identification of the characteristic during. In examples, controlling the apparatus can include adjusting various parameters of the apparatus, such as an energy of the laser pulse, pulse frequency, laser power, and a pulse mode when the apparatus includes a laser. Furthermore, 1018 can be performed in real-time, where one or more parameters of the apparatus can be adjusted during a surgical procedure in order to remove tissue, stone, or any other type of detritus from a surgical site.

In examples, if a determination is made that the tissue at the surgical site is cancerous, the controller 310 can control the laser to deliver a laser beam that can remove the cancerous tissue. Returning to the second illustration, here, the material removal device 501 is a Nd:YAG laser. Additionally, as noted above, the feedback analyzer 121 identified the tissue at the surgical site as being cancerous based on shapes, peak locations or other properties of the spectra. Thus, at 1016 in the second illustration, the automatic controller 310 automatically controls the material removal device 501 to emit a laser beam at a specific wavelength (e.g., 1064 nm) to remove the cancerous tissue at the surgical target site 500. Upon completion of 1018, the method 1000 is complete. Alternatively, operations 1002-1018 may iteratively be performed until a treatment effect is achieved (e.g., when a kidney stone is completed fragmentated or dusted).

As explained, the light source can be controlled to emit light at different wavelengths. One or more optical filters can be used to filter the sensed fluorescence signals, such as to permit use of a single or shared light pulse. For example, optical filtering techniques may be used to filter wavelengths associated with the second and third wavelengths thereby only allowing transmission of fluorescence signals associated with the first wavelength. Likewise, optical filtering techniques can be used to filter wavelengths associated with the first and third wavelengths thereby only allowing transmission of fluorescence signals associated with the first wavelength. In addition, optical filtering techniques can be used to filter wavelengths associated with the first and second wavelength thereby only allowing transmission of fluorescence signals associated with the third wavelength. Therefore, a light source can emit light at the first, second, and third wavelengths, and optical filtering techniques can be used to filter fluorescence signals associated with each of the first, second, and third wavelengths. Moreover, a spectra along with a characteristic based on the spectra can be determined based on the filtered wavelengths to control a treatment device, such as discussed above. For example, hardware, such as a wavelength filter, can be used to filter fluorescence signals associated with each of the first, second, and third wavelengths. Furthermore, a hardware device can be programmed with software that provides the hardware with the functionality to filter fluorescence signals associated with each of the first, second, and third wavelengths.

The method 1000 can be performed during a first time period during which a characteristic at the surgical target site 500 is determined and the material removal device 501 is controlled in real time based on the determination. During a second time period, the method 1000 can be repeated during which a characteristic at the surgical target site 500 is determined and the material removal device 501 can be controlled in real time based on the determination. The determined characteristic can change between the first and second time periods. The laser can be controlled in real time based on the change, or based on the identification of characteristic during the second time period.

For example, the laser can be controlled by making a second adjustment to adjust one or more laser parameters of a laser, such as an energy of the laser pulse, pulse frequency, laser power, and a pulse mode. The parameter adjusted after the first time can be a different parameter than the parameter adjusted after the second parameter, as explained above.

Figure 13:
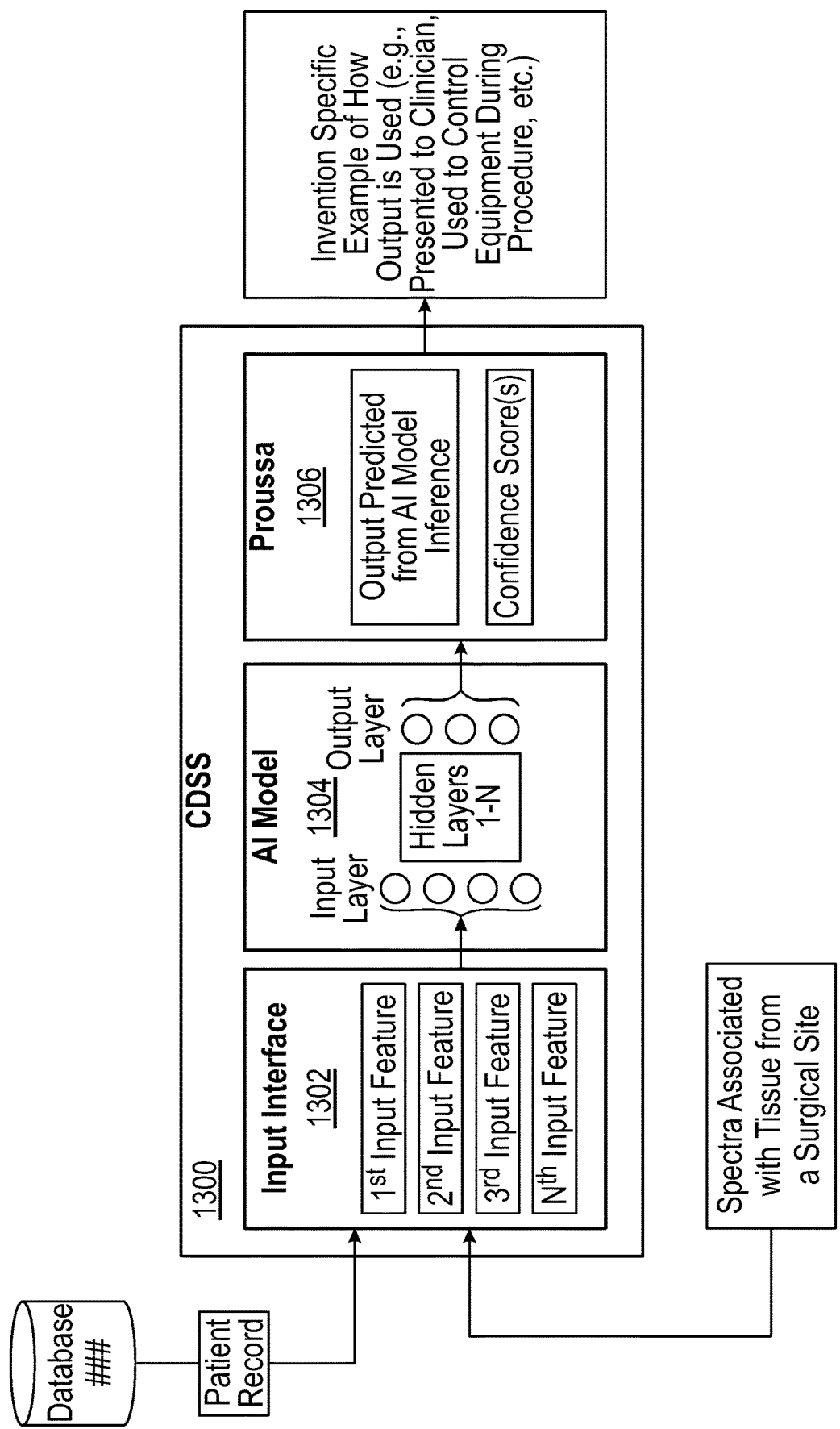
FIG. 13 is a schematic diagram of an example of portions of a computer-based clinical decision support system configured to determine a characteristic of a target site.

FIG. 13 shows a schematic diagram of an example of a computer-based clinical decision support system (CDSS) 1300 that can be configured to control a laser system based on determining a characteristic of material at a target site, such as tissue at a surgical site. The CDSS 1300 can include an input interface 1302 through which spectra associated with tissue at a surgical site, which is specific to a patient, are provided as input features to an artificial intelligence (AI) model 1304, where, in conjunction with a processor 1306, a characteristic of the tissue at the surgical site is output. An inference operation in which the spectra associated with tissue at a surgical site cam be applied to the AI model in order to generate an output 1308 describing the characteristic of the material at the target site, and a user interface (UI) through which the characteristic of the material at the target site is communicated to a user, e.g., a clinician.

The input interface 1302 can include a direct data link between the CDSS 1300 and one or more medical devices, such as the endoscope 102, that generate at least some of the input features. For example, the input interface 1302 can transmit spectra associated with tissue at a surgical site directly to the CDSS 1300 during a therapeutic and/or diagnostic medical procedure. Additionally, or alternatively, the input interface 1302 can include a user interface that facilitates interaction between a user and the CDSS 1300. To further illustrate, the input interface 1302 can facilitate a user interface through which the user can manually enter spectra associated with tissue at a surgical site. Additionally, or alternatively, the input interface 1302 can provide the CDSS 1300 with access to an electronic patient record from which one or more input features can be extracted. In any of these cases, the input interface 1302 is configured to collect one or more of various input features in association with a specific patient on or before a time at which the CDSS 1300 is used to determine a characteristic of material at a target site. For example, the first input feature through the $n^{th}$ input feature can relate to spectra associated with tissue at a surgical site at different time intervals. To further illustrate, the first input feature can correspond to spectra associated with tissue at a surgical site at first time interval while the $n^{th}$ input feature can correspond to spectra associated with tissue at a surgical site at $n^{th}$ time interval.

Based on one or more of the above input features, the processor 1306 can perform an inference operation using the AI model to generate a characteristic of the material at the target site. For example, input interface 1302 can deliver the spectra associated with material at a target site into an input layer of the AI model which propagates these input features through the AI model to an output layer. The AI model can provide a computer system the ability to perform tasks, without explicitly being programmed, by making inferences based on patterns found in the analysis of data. AI model explores the study and construction of algorithms (e.g., machine-learning algorithms) that can learn from existing data and make predictions about new data. Such algorithms operate by building an AI model from example training data in order to make data-driven predictions or decisions expressed as outputs or assessments.

Modes for machine learning (ML) can include: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Some tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some tasks for unsupervised ML include clustering, representation learning, and density estimation. Some examples of unsupervised-ML algorithms are K-means clustering, principal component analysis, and autoencoders.

Another type of ML is federated learning (also known as collaborative learning) that trains an algorithm across multiple decentralized devices holding local data, without exchanging the data. This approach stands in contrast to centralized machine-learning techniques where all the local datasets are uploaded to one server, as well as to more decentralized approaches which can assume that local data samples are identically distributed. Federated learning enables multiple actors to build a common, robust machine learning model without sharing data, thus allowing to address critical issues such as data privacy, data security, data access rights and access to heterogeneous data.

In some examples, the AI model can be trained continuously or periodically before performing inference operation by the processor 1306. Then, during the inference operation, the patient specific input features provided to the AI model can be propagated from an input layer, through one or more hidden layers, and ultimately to an output layer that provides output corresponding to the characteristic of the material at the target site. For example, when the output layer generates an output corresponding to the characteristic of the material at the target site a system being used to ablate the surgical site, such as the endoscope 102, the imaging platform 104, the laser controller 122, the controller 310, or the material removal device 501, can be adjusted based on the material characteristic to perform a surgical procedure.

During and/or subsequent to the inference operation, the characteristic of the material at the target site can be communicated to the user via the user interface (UI) and/or automatically cause the endoscope 102, the imaging platform 104, the laser controller 122, the controller 310, or the material removal device 501 for performing a desired action such as ablation of the surgical site.

Figure 14:
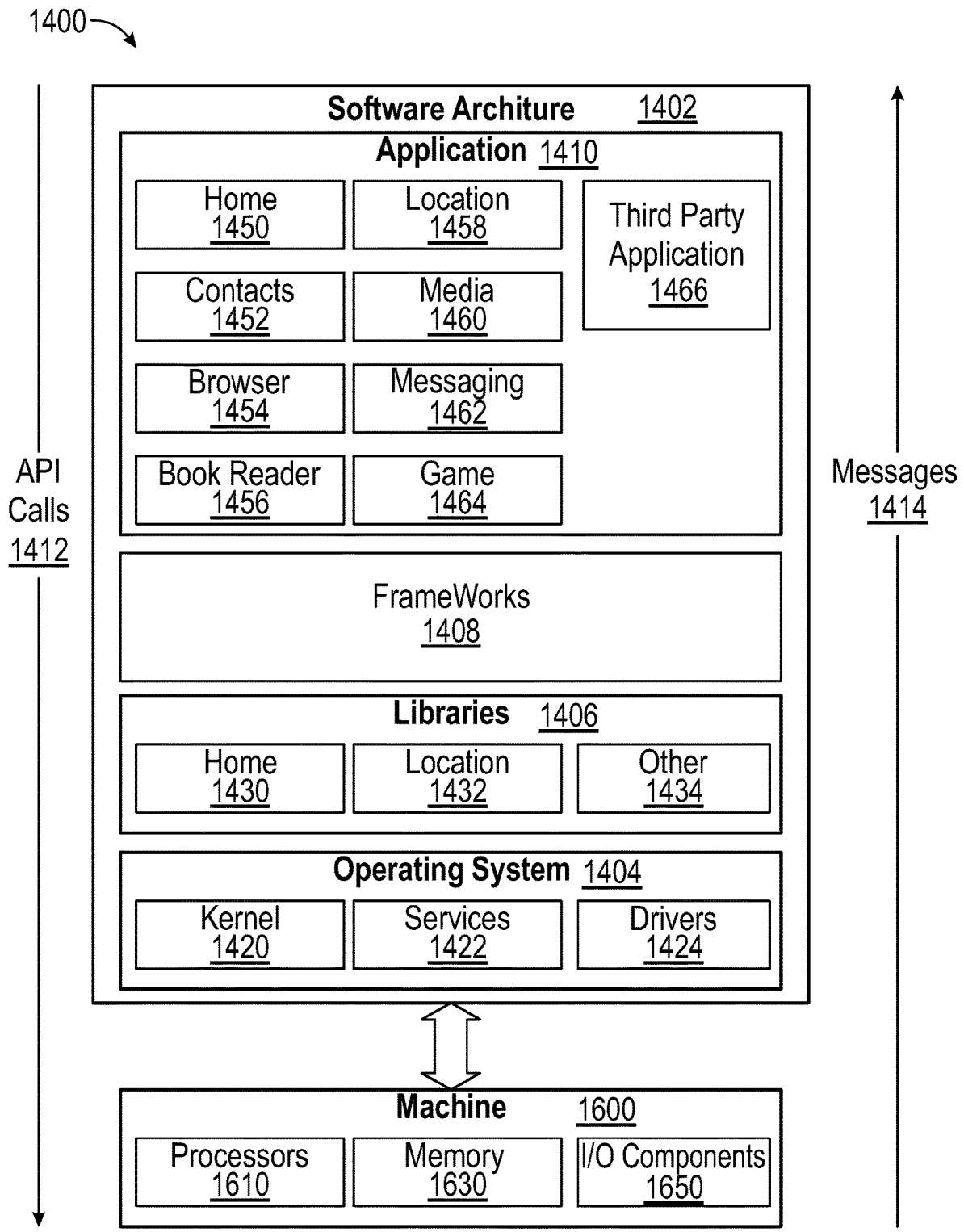
FIG. 14 is a block diagram illustrating an example of portions of a software architecture that can be installed on a machine.

FIG. 14 is a block diagram 1400 illustrating a software architecture 1102, which can be installed on any one or more of the devices (e.g., the articulation controller 116, laser controller 122, flush controller 124, feedback analyzer 121 and/or target detector 304) described above. FIG. 14 is merely a non-limiting example of a software architecture, and it will be appreciated that many other architectures can be implemented to facilitate the functionality described herein. The software architecture 1402 can be implemented by hardware such as a machine 1600 that includes processors 1610, memory 1630, and I/O components 1650. In this example, the software architecture 1402 can be conceptualized as a stack of layers where each layer can provide a particular functionality. For example, the software architecture 1402 includes layers such as an operating system 1404, libraries 1406, frameworks 1408, and applications 1410. Operationally, the applications 1410 invoke application programming interface (API) calls 1412 through the software stack and receive messages 1414 in response to the API calls 1412, according to some implementations.

In various implementations, the operating system 1404 manages hardware resources and provides common services. The operating system 1404 includes, for example, a kernel 1420, services 1422, and drivers 1424. The kernel 1420 acts as an abstraction layer between the hardware and the other software layers in some implementations. For example, the kernel 1420 provides memory management, processor management (e.g., scheduling), component management, networking, and security settings, among other functionality. The services 1422 can provide other common services for the other software layers. The drivers 1424 can be responsible for controlling or interfacing with the underlying hardware. For instance, the drivers 1424 can include display drivers, camera drivers, Bluetooth® drivers, flash memory drivers, serial communication drivers (e.g., Universal Serial Bus (USB) drivers), WiFi® drivers, audio drivers, power management drivers, and so forth.

In some implementations, the libraries 1406 provide a low-level common infrastructure that can be utilized by the applications 1410. The libraries 1406 can include system libraries 1430 (e.g., C standard library) that can provide functions such as memory allocation functions, string manipulation functions, mathematic functions, and the like. In addition, the libraries 1406 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1406 can also include a wide variety of other libraries 1434 to provide many other APIs to the applications 1410.

The frameworks 1408 provide a high-level common infrastructure that can be utilized by the applications 1410, according to some implementations. For example, the frameworks 1408 provide various graphic user interface (GUI) functions, high-level resource management, high-level location services, and so forth. The frameworks 1408 can provide a broad spectrum of other APIs that can be utilized by the applications 1410, some of which can be specific to a particular operating system or platform.

The applications 1410 can include a home application 1450, a contacts application 1452, a browser application 1454, a book reader application 1456, a location application 1458, a media application 1460, a messaging application 1462, a game application 1464, and a broad assortment of other applications such as a third-party application 1466. The applications 1410 can include programs that execute functions defined in the programs. Various programming languages can be employed to create one or more of the applications 1410, structured in a variety of manners, such as object-orientated programming languages (e.g., Objective-C, Java, or C++) or procedural programming languages (e.g., C or assembly language). In a specific example, the third-party application 1466 (e.g., an application developed using the Android™ or iOS™ software development kit (SDK) by an entity other than the vendor of the particular platform) can be mobile software running on a mobile operating system such as iOS™, Android™ Windows® Phone, or other mobile operating systems. In this example, the third-party application 1466 can invoke the API calls 1412 calls 1412 provided by the mobile operating system (e.g., the operating system 1404) to facilitate functionality described herein.

Certain examples are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In examples, one or more computer systems (e.g., a standalone, client or server computer system) or one or more processors can be configured by software (e.g., an application or application portion) as a hardware-implemented module that operates to perform certain operations as described herein.

In various examples, a hardware-implemented module can be implemented mechanically or electronically. For example, a hardware-implemented module can include dedicated circuitry or logic that is permanently configured (e.g., as a special-purpose processor, such as a field programmable gate array (FPGA) or an application-specific integrated circuit (ASIC)) to perform certain operations. A hardware-implemented module can also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor can be configured as respectively different hardware-implemented modules at different times. Software, accordingly, can configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiples of such hardware-implemented modules exist contemporaneously, communications can be achieved through signal transmission (e.g., over appropriate circuits and buses) that connects the hardware-implemented modules. In examples in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some examples, include processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but also deployed across a number of machines. In some examples, the processor or processors can be located in a single location (e.g., within a home environment, an office environment or as a server farm), while in other examples, the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network 115 (e.g., the Internet) and via one or more appropriate interfaces (e.g., application program interfaces (APIs).)

Examples can be implemented in digital electronic circuitry, or in computer hardware, firmware, software, or in combinations of them. Examples can be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and can interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various examples.

Figure 15:
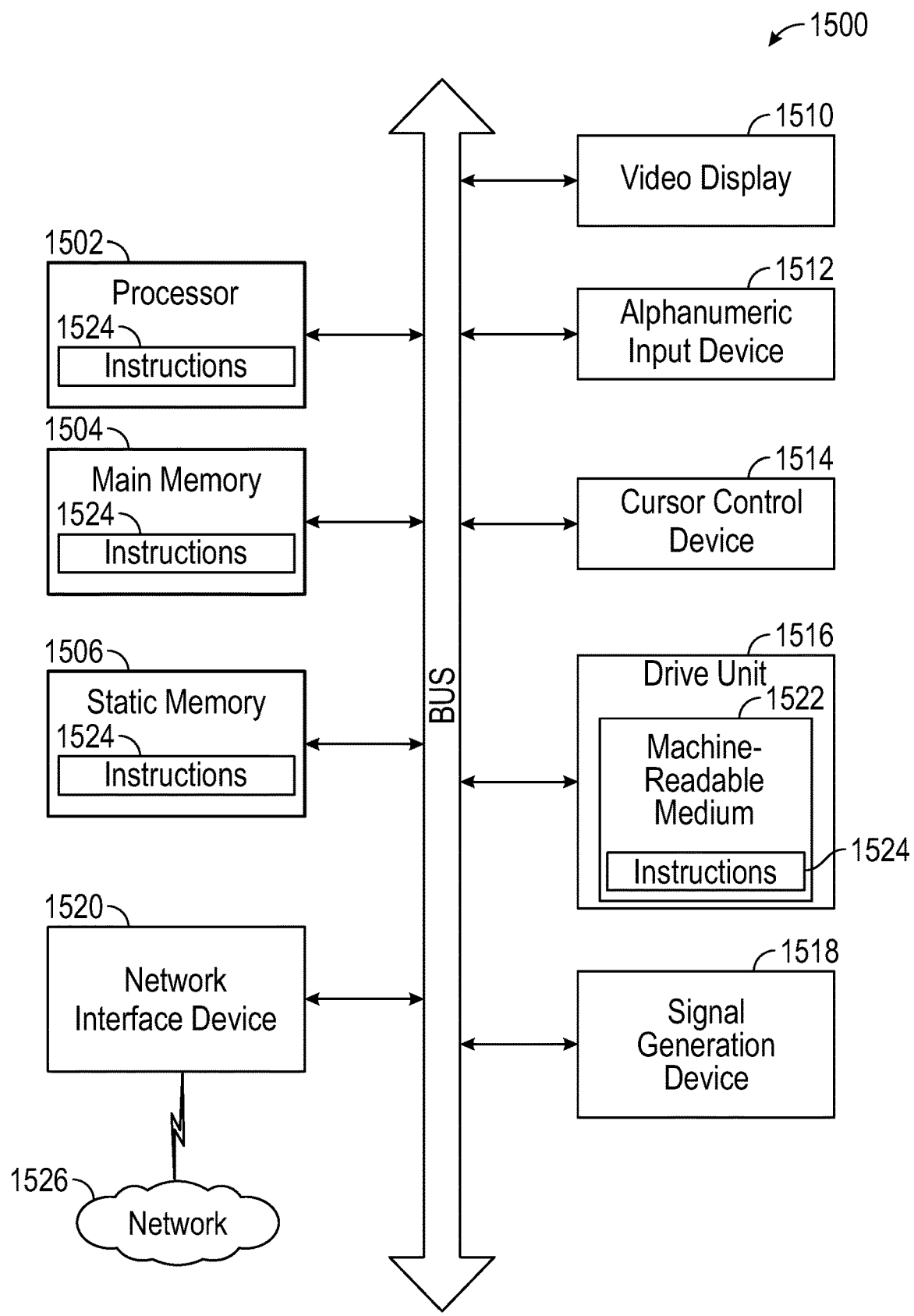
FIG. 15 is a diagrammatic representation of an example of a machine in the form of a computer system with which a set of instructions can be performed for causing the machine to perform any one or more of the techniques described herein.

FIG. 15 is a block diagram of a machine within which instructions can be executed for causing the machine to perform any one or more of the methodologies discussed herein. In one example, the machine can be any of the devices described above. In alternative examples, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The example of a computer system 1500 includes a processor 1502 (e.g., a central processing unit (CPU), a graphics processing unit (GPU) or both), a main memory 1504 and a static memory 1506, which communicate with each other via a bus 1508. The computer system 1500 can further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation device (cursor control device) 1514 (e.g., a mouse), a disk drive unit 1516 drive unit 1516, a signal generation device 1518 (e.g., a speaker) and a network interface device 1520.

The drive unit 1516 includes a machine-readable medium 1522 on which is stored one or more sets of instructions and data structures (e.g., software) 1524 embodying or utilized by any one or more of the methodologies or functions described herein. The instructions 1524 can also reside, completely or at least partially, within the main memory 1504 and/or within the processor 1502 during execution thereof by the computer system 1500, the main memory 1504 and the processor 1502 also constituting machine-readable media. Instructions 1524 can also reside within the static memory 1506.

While the machine-readable medium 1522 is shown in an example to be a single medium, the term "machine-readable medium" can include a single medium or multiple media (e.g., a centralized or distributed database, and/or associated caches and servers) that store the one or more instructions or data instructions 1524. The term "machine-readable medium" shall also be taken to include any tangible medium that is capable of storing, encoding or carrying instructions 1524 for execution by the machine and that cause the machine to perform any one or more of the methodologies of the present invention, or that is capable of storing, encoding or carrying data structures utilized by or associated with such instructions 1524. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 1524 can further be transmitted or received over a communications network 1526 using a transmission medium. The instructions 1524 can be transmitted using the network interface device 1520 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding or carrying instructions 1524 for execution by the machine, and includes digital or analog communications signals or other intangible media to facilitate communication of such software.

Figure 16:
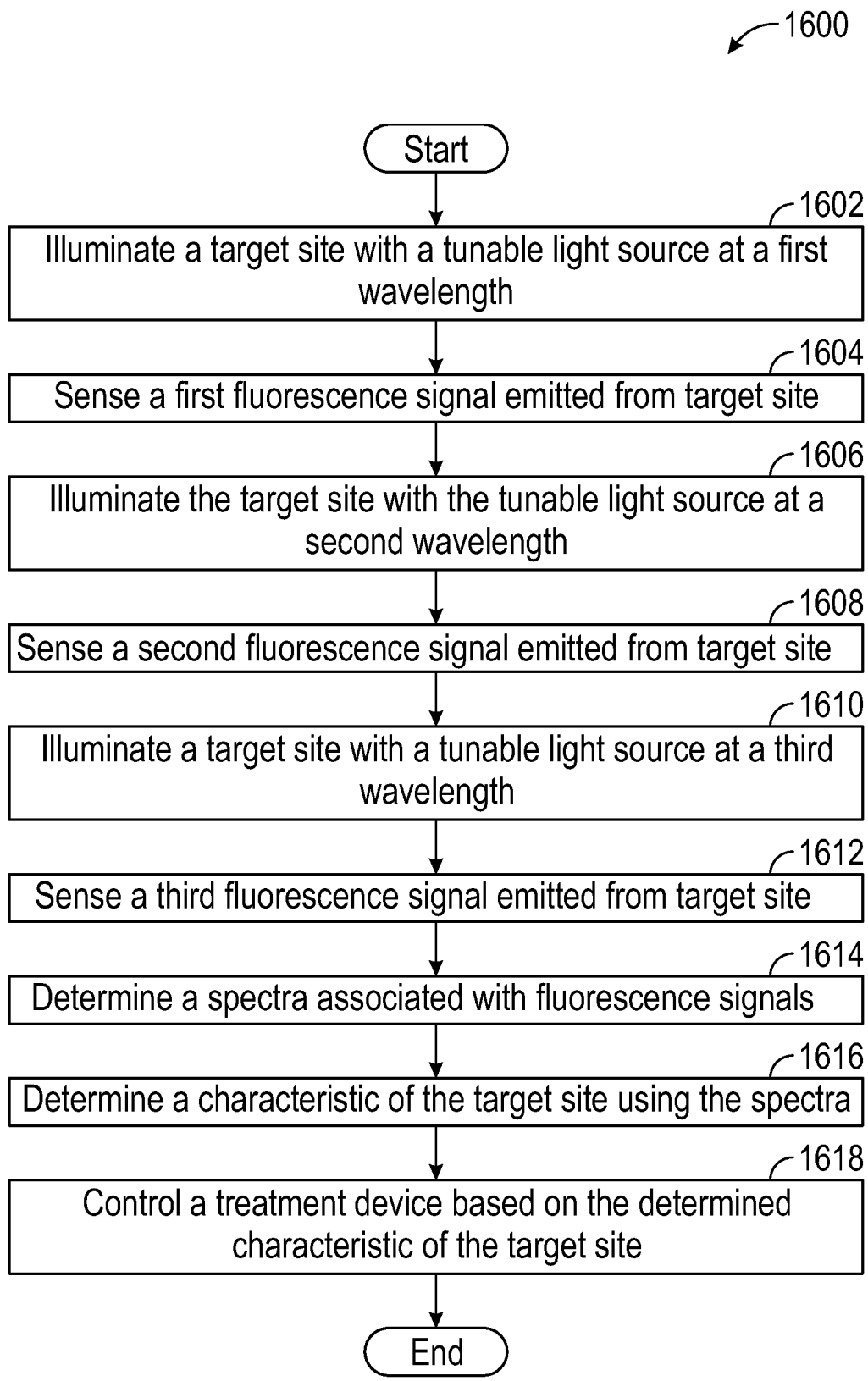
FIG. 16 shows an example of a method of determining a characteristic of a target site.

FIG. 16 shows an example of a method 1600 using a single tunable light source that can be tuned to emit light at different excitation wavelengths can be used to determine a characteristic of a target site. To further illustrate, a single Quantum Cascade Laser (QCL) can be used to emit light at different wavelengths in order to determine a characteristic of a target site. At 1602, a tunable light source can be used to illuminate a target with light at a first wavelength. The first wavelength can correspond to a first color, such as one of red, green, or blue. A QCL can be tuned to emit light at a first wavelength in order to illuminate a target site. At 1604, a first fluorescence signal can be sensed using the techniques described above.

At 1606, after the first fluorescence signal is detected at 1604, the tunable light source can be controlled to emit light at a second wavelength in order to illuminate the target with light at the second wavelength. Here, the second wavelength can correspond to a second color, such as one of red, green, or blue. The second color can be different from the first color. For example, if the first color was red, the second color can be one of green or blue. The QCL can be tuned to emit light at a second wavelength in order to illuminate the target site. Upon illumination of the target site at 1606, a second fluorescence signal can be sensed as described above.

At 1610, after the second fluorescence signal is detected at 1608, the tunable light source can be controlled to emit light at a third wavelength in order to illuminate the target with light at the third wavelength. Here, the third wavelength can correspond to a third color, such as one of red, green, or blue. The third color can be different from the first color and the second color. For example, if the first color was red, and the second color was green, the third color can be blue. The QCL can be tuned to emit light at a third wavelength to illuminate the target site. At 1612, upon illumination of the target site at 1610, a third fluorescence signal can be sensed using the techniques described above.

At 1614, after sensing the first, second, and third fluorescence signals at 1604, 1608, and 1612, a spectra associated with each of the first, second, and third signals can be determined. The feedback analyzer 121 can be used to determine the spectra associated with the fluorescence signals as discussed above. Reflectance spectra can be extracted from a reflectance spectrum or normalized reflectance spectrum of a known calculus structure of the target site.

At 1616, after determining a spectra associated with the first, second, and third fluorescence signals at 1614, a characteristic of the target site can be identified using one or both of the fluorescence or reflectance or other response spectra as detailed above. Also, the target detector 304 can trend reflectance intensities of the characteristic at a target site over a range of wavelengths and identify the characteristic based on the trend of the reflectance intensities as previously discussed.

After the characteristic of the target site is determined in, at 1618, the method 1600 can control a treatment device based on the determined characteristic of the target site in real time. Upon completion of 1618, the method 1600 is complete.

In the method 1600, examples were discussed where a tunable light source can be controlled to emit light at different wavelengths. In accordance with examples, an optical filter can be used to filter the sensed fluorescence signals. The types of filtering that can be used can include band, low, or high pass optical filters or a combination of such can be deployed to isolate the fluorescent signal from adjacent signals and from the excitation wavelength. For example, if the fluorescent response signal to an excitation illumination has a longer wavelength than any other signal of interest, a high-pass filter can be deployed to attenuate signals below that wavelength of interest. Here, high-pass can refer to wavelength instead of frequency. A higher frequency has a lower wavelength and vice versa. Alternatively, if the fluorescence response signal of interest occurs at a wavelength that is surrounded by other signals, a band-pass filter centered at the wavelength of the fluorescence response may be deployed. For example, optical filtering techniques could be used to filter wavelengths associated with the second and third wavelengths thereby only allowing transmission of fluorescence signals associated with the first wavelength. Likewise, optical filtering techniques could be used to filter wavelengths associated with the first and third wavelengths thereby only allowing transmission of fluorescence signals associated with the first wavelength. In addition, optical filtering techniques could be used to filter wavelengths associated with the first and second wavelength thereby only allowing transmission of fluorescence signals associated with the third wavelength. Therefore, a light source can emit light at the first, second, and third wavelengths where optical filtering techniques can be used to filter fluorescence signals associated with each of the first, second, and third wavelengths. Moreover, a spectra along with a characteristic based on the spectra could be determined based on the filtered wavelengths in order to control a treatment device, as discussed above.

The above detailed description includes references to the accompanying drawings, which form a part of the detailed description. The drawings show, by way of illustration, specific examples in which the invention can be practiced. These examples are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

What is claimed is:

1. A system comprising:
a light source for delivering illumination to a target, the light source including a plurality of light-emitting diodes (LEDs), wherein individual light emitting diodes (LEDs) of the plurality of LEDs emits light at different wavelengths;
a controller configured to:
cause a first LED of the plurality of LEDs to be in an on state and emit a first illumination while a second LED of the plurality of LEDs is in an off state;
cause the second LED to be in the on state and emit a second illumination while the first LED is in the off state;
a detector configured to detect a first fluorescence signal from the target in response to the first illumination while the second LED is in the on state;
the controller being further configured to: analyze the detected first fluorescence signal; and determine at least one characteristic of the target based at least in part on the analysis of the detected first fluorescence signal; and
a treatment device, wherein the treatment device includes a laser system and the controller is further configured to operate the laser system by adjusting at least one parameter setting associated with the laser system based on the detected first fluorescence signal.

2. The system of claim 1, wherein the controller is further configured to analyze at least one of a fluorescence intensity, a fluorescence excitation spectrum, a fluorescence emission spectrum or a fluorescence decay time associated with the detected first fluorescence signal.

3. The system of claim 1, wherein the detector is further configured to detect a second fluorescence signal from the target in response to the second illumination and the controller is configured to:
cause the detector to detect the first fluorescence signal in accordance with operation of the first LED and the second LED;
cause the detector to detect the second fluorescence signal in accordance with operation of the second LED; and
determine at least one characteristic of the target based at least in part on the detected first fluorescence signal and the detected second fluorescence signal.

4. The system of claim 3, wherein the controller is further configured to cause a third LED of the plurality of LEDs to be in the on state and emit light during a third illumination and cause the first LED to be in the off state and the second LED to be in the off state while the third LED is in the on state and the detector is further configured to detect a third fluorescence signal from the target in response to the third illumination and the controller is further configured to determine the at least one characteristic based at least in part on the first fluorescence signal, the second fluorescence signal, and the third fluorescence signal.

5. A system comprising:
a light source comprising a plurality of light-emitting diodes (LEDs) for delivering illumination to a target, the light source including a plurality of light-emitting diodes (LEDs), wherein individual light emitting diodes (LEDs) of the plurality of LEDs emits light at different wavelengths;
a detector configured to detect a first fluorescence signal from the target in response to a first illumination of a first LED of the plurality of LEDs while a second LED of the plurality of LEDs is in an on state; and
a controller configured to:
cause a first light emitting diode (LED) of the plurality of LEDs to be in an on state and emit light during a first illumination;
cause a second LED of the plurality of LEDs to be in an off state while the first LED is in the on state;
cause the second LED to be in the on state and emit light during a second illumination;
cause the first LED to be in the off state while the second LED is in the on state;
a detector configured to detect a first fluorescence signal from the target in response to the first illumination while the second LED of the plurality of LEDs is in the on state, wherein the controller is further configured to:
analyze the detected first fluorescence signal from the target in accordance with operation of the plurality of LEDs; and
determine at least one characteristic of the target based at least in part on the analysis of the detected first fluorescence signal; and a treatment device, wherein the treatment device includes a laser system and the controller is further configured to operate the laser system by adjusting at least one parameter setting associated with the laser system based on the detected first fluorescence signal.

6. The system of claim 5, wherein the controller is further configured to sequentially activate the plurality of light-emitting diodes.

7. The system of claim 6, wherein the controller is further configured to sequentially activate the plurality of light-emitting diodes at a rate to produce white light.

8. The system of claim 6, wherein the controller is further configured to deactivate one or more previously activated LEDs when a current one of the plurality of LEDs is currently activated.

9. The system of claim 8, wherein the controller is further configured to cause the detector to detect at least one fluorescence signal from the target in response to at least one of the previously activated plurality of LEDs when the current one of the plurality of LEDs is currently activated.

10. The system of claim 5, wherein the controller is further configured to analyze at least one of a fluorescence intensity, a fluorescence excitation spectrum, a fluorescence emission spectrum or a fluorescence decay time associated with the detected first fluorescence signal.

11. A method comprising:
illuminating a target with a first light emitting diode (LED) of a light source having a plurality of light-emitting diodes (LEDs), wherein individual light-emitting diodes of the plurality of LEDs is configured to emit light at a different wavelength;
causing a second LED of the plurality of LEDs to be in an off state while the first LED is in an on state and illuminating the target;
illuminating the target with second LED;
causing the first LED to be an on off state while the second LED is illuminating the target;
detecting a first fluorescence signal from the target in response to the illumination from first LED while the second LED is illuminating the target;
analyzing the detected first fluorescence signal;
determining at least one characteristic of the target based at least in part on the analysis of the detected first fluorescence signal; and
adjusting at least one parameter setting associated with a laser system of a treatment device based on the detected first fluorescence signal.

12. The method of claim 11, the method further comprising sequentially activating the plurality of LEDs.

13. The method of claim 12, the method further comprising sequentially activating the plurality of light-emitting diodes at a sufficiently high rate such that white light is produced.

* * * * *